US012380547B2

(12) United States Patent
Weerasinghe et al.

(10) Patent No.: US 12,380,547 B2
(45) Date of Patent: Aug. 5, 2025

(54) AVATAR BASED MITIGATION OF SPORADIC PIXELATION IN DIGITAL VIDEO

(71) Applicant: Charter Communications Operating, LLC, St. Louis, MO (US)

(72) Inventors: Srilal M. Weerasinghe, Parker, CO (US); Vipul Patel, Parker, CO (US); David Chen, Aurora, CO (US); Erdogan Simsek, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 60 days.

(21) Appl. No.: 18/304,155

(22) Filed: Apr. 20, 2023

(65) Prior Publication Data

US 2024/0354918 A1     Oct. 24, 2024

(51) Int. Cl.
| | |
|---|---|
| G06T 11/00 | (2006.01) |
| G06T 7/00 | (2017.01) |
| G06T 7/50 | (2017.01) |
| G06V 10/70 | (2022.01) |
| G06V 20/40 | (2022.01) |
| G11B 27/036 | (2006.01) |
| G11B 27/10 | (2006.01) |
| G06V 40/16 | (2022.01) |

(52) U.S. Cl.
CPC .............. *G06T 7/0002* (2013.01); *G06T 7/50* (2017.01); *G06T 11/00* (2013.01); *G06V 10/70* (2022.01); *G06V 20/40* (2022.01); *G11B 27/036* (2013.01); *G11B 27/10* (2013.01); *G06T 2207/10016* (2013.01); *G06T 2207/30168* (2013.01); *G06T 2207/30201* (2013.01); *G06V 40/161* (2022.01)

(58) Field of Classification Search
CPC ......... G06T 7/0002; G06T 7/50; G06T 11/00; G06T 2207/10016; G06T 2207/30168; G06T 2207/30201; G06V 10/70; G06V 20/40; G06V 40/161; G11B 27/036; G11B 27/10
See application file for complete search history.

(56) References Cited

U.S. PATENT DOCUMENTS

| | | | |
|---|---|---|---|
| 8,200,028 B2 | 6/2012 | Gabso et al. | |
| 11,039,146 B2 | 6/2021 | Babbar et al. | |
| 11,334,979 B2 | 5/2022 | Hoegen | |
| 2010/0080459 A1* | 4/2010 | Dai | G06T 5/40 |
| | | | 382/170 |
| 2018/0336713 A1* | 11/2018 | Avendano | G06T 13/40 |
| 2020/0236349 A1* | 7/2020 | Zhai | H04N 19/61 |
| 2021/0344930 A1 | 11/2021 | Wang et al. | |
| 2024/0160583 A1* | 5/2024 | Subramaniam | G06F 3/017 |

* cited by examiner

*Primary Examiner* — William C Vaughn, Jr.
*Assistant Examiner* — Jose M Mesa
(74) *Attorney, Agent, or Firm* — The Marbury Law Group, PLLC

(57) ABSTRACT

Systems and methods for detecting and/or mitigating video artifacts in a video. A processor in a computing device may be configured to receive the video from a video source (e.g., codec or from any other video source compressed or uncompressed) subtract pixel intensities from two consecutive frames in the video to generate a residual, analyze the residual to detect small rectangular shapes, and identifying a video artifact in the video based on a result of the analysis.

30 Claims, 16 Drawing Sheets

| | 1 | 2 | 3 | 4 | 5 | 6 | 7 | 8 | 9 | 10 | 11 | 12 | 13 | 14 | 15 | |
|---|---|---|---|---|---|---|---|---|---|---|---|---|---|---|---|---|
| | w | w | w | w | w | w | w | w | w | w | w | r | r | r | r | 1st Column |
| | w | w | w | w | w | w | w | w | r | r | r | r | r | r | w | 2nd Column |
| | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | |
| | r | r | r | w | w | w | w | w | w | w | w | w | r | r | r | 15th Column |

AVATAR BASED MITIGATION OF SPORADIC PIXELATION IN DIGITAL VIDEO

BACKGROUND

Video artifacts (e.g., pixelation, macroblocking, etc.) are unwanted visual distortions that negatively impact the image quality of a video signal and consequently the end-user experience. These artifacts may occur when a digital signal is weak or disrupted and/or may be caused by various factors, including excessive video compression, bandwidth limitations, signal interruptions, and hardware or software glitches. Resolving video artifacts may present a variety of technical challenges due to the constant interplay between capacity and demand. That is, the growing demand for high-quality video content drives the need for increased bandwidth and capacity, and increased bandwidth and capacity drives the demand for higher-quality video content. As a result, capacity may struggle to meet with demand, leading to lower image quality and more frequent video artifacts.

Emerging video coding standards, such as High Efficiency Video Coding (HEVC) H.265 and H.266/Versatile Video Coding (VVC), offer improved compression algorithms that enable more efficient data storage, transmission, and viewing. These standards maintain high image quality by better predicting and analyzing the visual content of a video, which may result in smaller file sizes without sacrificing quality. However, the benefits of these advanced standards may be offset by new and emerging bandwidth-intensive applications (e.g., 4K and 8K video, virtual and augmented reality, cloud gaming, etc.). As such, new and improved techniques that reduce, eliminate, or resolve video artifacts may be beneficial for content providers, network operators, service providers, and consumers of their services.

SUMMARY

Various aspects include methods of detecting video artifacts in a video stream or broadcast, which may include receiving, by a processor in a computing device, the video from a video source, subtracting pixel intensity values from two consecutive frames in the video to generate a residual that identifies differences between the two consecutive frames, and identifying a video artifact in the video based on the generated residual.

In some aspects, identifying the video artifact in the video based on the generated residual may include analyzing the residual to detect shapes, and determining whether the video may include a video artifact based on the detected shapes. In some aspects, analyzing the residual to detect shapes may include analyzing the residual to detect small rectangular, quadrilateral, triangular or amorphous shapes. In some aspects, identifying the video artifact in the video based on the generated residual may include inputting the generated residual into a machine learning (ML) detector, determining whether the video may include a video artifact based on the output of the ML detector.

Some aspects may further include receiving or generating an avatar for detected faces in the video based on the output of the ML detector, integrating the received or generated avatar into the video frames that include the video artifacts, generating a modified video stream or broadcast that may include the integrated avatar, and switching a regular video stream or broadcast with the generated modified video stream or broadcast. In some aspects, receiving or generating the avatar for detected faces in the video based on the output of the ML detector may include querying an avatar database to determine whether an avatar already exists for a detected face, and create a new avatar in response to determining that the avatar does not exist for the detected face. In some aspects, integrating the generated avatar into the video frames that include the video artifacts and generating the modified video stream or broadcast that may include the integrated avatar include replacing a detected human face in the video with a reconstructed avatar frame-by-frame, mapping intonations and accentuations of a corresponding audio to avatar facial expressions of the detected human face, and synchronizing timestamps of the audio and video for proper continuity.

In some aspects, integrating the generated avatar into the video frames that include the video artifacts and generating the modified video stream or broadcast that may include the integrated avatar further may include replacing artifacts on a background portion of video frame to generate an updated background portion, integrating the generated avatar and the updated background portion to create a composite image, and integrating the composite image into the video frames that include the video artifacts. In some aspects, the ML detector may include one or more of a neural network, or a non-neural statistical classification model. In some aspects, the ML detector may include a first ML engine for detecting artifacts and a second ML engine for detecting faces. In some aspects, the comparison metrics include one or more of a pixel intensity metric, a Mean Square Error (MSE) metric, or a Structural Similarity Index (SSIM) metric.

Further aspects may include a computing device having a processor configured with processor-executable instructions to perform various operations corresponding to the methods discussed above.

Further aspects may include a computing device having various means for performing functions corresponding to the method operations discussed above.

Further aspects may include a non-transitory processor-readable storage medium having stored thereon processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

FIGS. 5A and 5B are component block diagrams that illustrate an example 15×15 grid that may be used to construct an input layer of a neural network to identify letters in the alphabet, and which may be configured to perform detection and mitigation operations in accordance with the various embodiments.

DETAILED DESCRIPTION

Figure 1A:
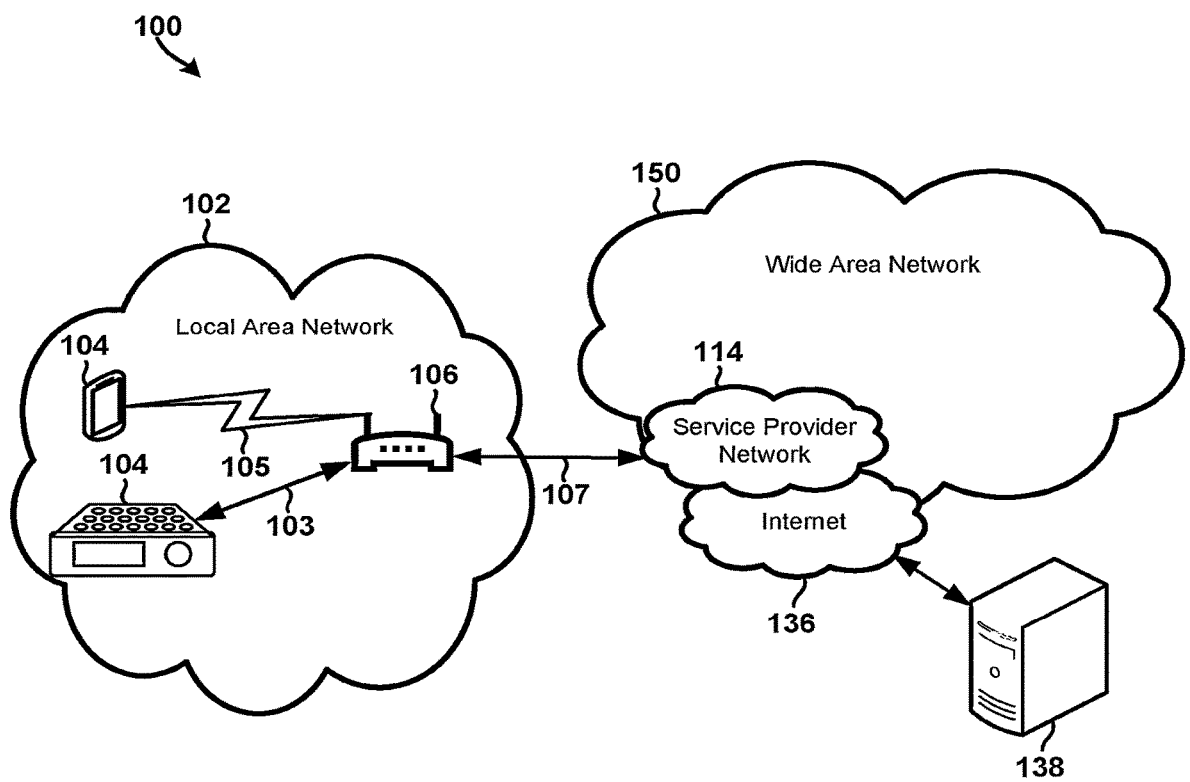
FIGS. 1A and 1B are block diagrams of example systems that may be used to deliver audio-video content in accordance with some embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

In overview, the various embodiments include methods, and computing devices configured to implement the methods, for detecting and mitigating video artifacts (e.g., pixelation, macroblocking, etc.) in video broadcasts and streams. A computing device may be configured to receive a video stream from a codec or from any video source compressed or uncompressed, subtract pixel intensity values from two consecutive frames in the video stream to generate a residual that identifies differences between the two consecutive frames, and identify video artifacts in the video stream based on the generated residual. For example, the computing device may input the generated residual into a machine learning (ML) detector (e.g., neural network, non-neural statistical classification model, etc.) and determine whether the video stream includes a video artifact based on the output of the ML detector. As a further example, the computing device may analyze the residual to detect small shapes (e.g., rectangular, quadrilateral, triangular or amorphous shapes, etc.) and determine whether the video stream includes a video artifact based on whether the residual includes small rectangular shapes.

In some embodiments, the computing device may be further configured to receive or generate an avatar for detected faces in the video stream based on the output of the ML detector. For example, the computing device may query an avatar database to determine whether an avatar already exists for a detected face, and create a new avatar in response to determining that the avatar does not exist for the detected face. The computing device may integrate the generated/received avatar into the video frames that include the video artifacts, generate a modified video stream or broadcast that includes the integrated avatar, and switch a regular video stream or broadcast with the modified video stream or broadcast. For example, the computing device may replace a detected human face in the video stream with a reconstructed avatar frame-by-frame, map intonations and accentuations of corresponding audio to the avatar facial expressions of the detected human face, and synchronize timestamps of the audio and video for proper continuity.

The term "neural network" is used herein to refer to an interconnected group of processing nodes (e.g., neuron models, etc.) that collectively operate as a software application or process that controls a function of a computing device or generates a neural network inference. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and activation. The weight values may be determined during a training phase and iteratively updated as data flows through the neural network.

Deep neural networks implement a layered architecture in which the activation of a first layer of nodes becomes an input to a second layer of nodes, the activation of a second layer of nodes becomes an input to a third layer of nodes, and so on. As such, computations in a deep neural network may be distributed over a population of processing nodes that make up a computational chain. Deep neural networks may also include activation functions and sub-functions (e.g., a rectified linear unit that cuts off activations below zero, etc.) between the layers. The first layer of nodes of a deep neural network may be referred to as an input layer. The final layer of nodes may be referred to as an output layer. The layers in-between the input layer and the final layer may be referred to as hidden layers, intermediate layers, or black-box layers.

Each layer in a neural network may have multiple inputs, and thus multiple previous or preceding layers. Said another way, multiple layers may feed into a single layer. For ease of reference, some of the embodiments are described with reference to a single input or single preceding layer. However, it should be understood that the operations disclosed and described in this application may be applied to each of multiple inputs to a layer as well as multiple preceding layers.

The term "convolutional neural network" (CNN) may be used herein to refer to a deep neural network in which the computation in at least one layer is structured as a convolution. A convolutional neural network may also include multiple convolution-based layers, which allows the neural network to use a very deep hierarchy of layers. In convolutional neural networks, the weighted sum for each output activation may be computed based on a batch of inputs, and the same matrices of weights (called "filters") may be applied to every output. These networks may also implement a fixed feedforward structure in which all the processing nodes that make up a computational chain may be used to process every task, regardless of the inputs. In such feedforward neural networks, all of the computations are performed as a sequence of operations on the outputs of a previous layer. The final set of operations may generate the overall inference result of the neural network, such as a probability that an image contains a specific object (e.g., a person, cat, watch, edge, etc.) or information indicating that a proposed action should be taken.

The term "recurrent neural network (RNN)" may be used herein to refer to a type of neural network that is designed to work with sequential data. Unlike CNNs and networks that implement a fixed feedforward structure, RNNs have loops that allow information to persist over time, making them well-suited for processing sequential data such as speech.

The term "autoencoders" may be used herein to refer to a type of neural network that may learn to represent data without being explicitly told what features to look for. Autoencoders may include an encoder that maps the input data into a lower-dimensional representation and a decoder that reconstructs the input from the lower-dimensional representation.

The term "generative adversarial network (GNN)" may be used herein to refer to a type of neural network that typically includes: a generator neural network and a discriminator neural network. The generator neural network may generate fake data, and the discriminator neural network may perform operations to distinguish between fake and real data. The two networks may be trained together in an adversarial process in which the generator neural network learns to produce increasingly realistic data and the discriminator neural network learns to become better at distinguishing between fake and real data.

The term "inference" may be used herein to refer to a process that is performed at runtime or during the execution of the software application program corresponding to the neural network. Inference may include traversing the processing nodes in the neural network along a forward path to produce one or more values as an overall activation or overall "inference result."

The term "service provider network" is used generically herein to refer to any network suitable for providing consumers with access to the Internet or IP services over broadband connections and may encompass both wired and wireless networks/technologies. Examples of wired network technologies and networks that may be included within a service provider network include cable networks, fiber optic networks, hybrid-fiber-cable networks, Ethernet, local area networks (LAN), metropolitan area networks (MAN), wide area networks (WAN), networks that implement the data over cable service interface specification (DOCSIS), networks that utilize asymmetric digital subscriber line (ADSL) technologies, satellite networks that send and receive data etc. Examples of wireless network technologies and networks that may be included within a service provider network include third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), Bluetooth®, land mobile radio (LMR), and integrated digital enhanced network (iden). Each of these wired and wireless technologies involves, for example, the transmission and reception of data, signaling and/or content messages. Any references to terminology and/or technical details related to an individual wired or wireless communications standard or technology are for illustrative purposes only, and not intended to limit the scope of the claims to a particular communication system or technology unless specifically recited in the claim language.

The terms "user device" and "user equipment (UE)" may be used generically and interchangeably herein to refer to any one or all of satellite or cable set top boxes (STBs), laptop computers, rack mounted computers, routers, cellular telephones, smart phones, personal or mobile multi-media players, personal data assistants (PDAs), customer-premises equipment (CPE), tablet computers, smart books, palm-top computers, wireless electronic mail receivers, multimedia Internet enabled cellular telephones, wireless gaming controllers, streaming media players (such as, ROKU™), smart televisions, digital video recorders (DVRs), modems, routers, network switches, residential gateways (RG), access nodes (AN), bridged residential gateway (BRG), fixed mobile convergence products, home networking adapters and Internet access gateways that enable consumers to access communications service providers' services and distribute them around their house via a local area network (LAN), and similar electronic devices which include a programmable processor and memory and circuitry for providing the functionality described herein.

The terms "component," "system," and the like may be used herein to refer to a computer-related entity (e.g., hardware, firmware, a combination of hardware and software, software, software in execution, etc.) that is configured to perform particular operations or functions. For example, a component may be, but is not limited to, a process running on a processor, a processor, an object, an executable, a thread of execution, a program, and/or a computing device. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer-readable media having various instructions and/or data structures stored thereon. Components may communicate by way of local and/or remote processes, function or procedure calls, electronic signals, data packets, memory read/writes, and other known computer, processor, and/or process-related communication methodologies.

Generally, a video stream (also referred simply as a video) is a sequence of still images that change over time. Each video frame may include pixels, which are the smallest units in a digital display. For example, in a 1080p HD resolution, there are 1080 vertical and 1920 horizontal pixels, totaling 2 million pixels. In computer graphics, each pixel is usually color-coded with three bytes (representing red, green, and blue), allowing for over 16 million color combinations per pixel (each byte is 8 bits with $2^8$ (256) binary states).

The term "perceptual error" may be used herein to refer to visual distortions, artifacts, or imperfections that are noticeable to the human eye, but not necessarily detectable by standard error correction mechanisms. Many video artifacts are perceptual errors that result from factors such as weak signals, excessive compression, bandwidth limitations, or hardware and software glitches. Some embodiments may address these perceptual errors in digital media by using specialized techniques, such as machine learning and video coding algorithms, to detect and mitigate distortions and other video artifacts to improve overall image quality.

The term "residual" may be used herein to refer to the difference in visual content between adjacent video frames.

The term "macroblock" may be used herein to refer to a group of pixels (e.g., a 16×16 square, etc.) in a digital image that is treated as one unit during the video encoding process.

The terms "macroblocking," "occasional macroblocking," "pixilation," "sporadic pixelation" may be used generically and interchangeably herein to refer to any video artifact that obscures details and/or smooths edges in the original image. For example, pixilation may be a video artifact that is characterized by abnormally large pixel blocks that are often square or rectangular in shape.

A video artifact is a visual distortion or anomaly that occurs during various stages of digital video content processing, such as compression, transmission, or playback. These artifacts may manifest in different forms, including pixelation, noise, color banding, or other irregularities that degrade the video's quality or disrupt the viewer's experience. Factors that may contribute to the occurrence of video artifacts include excessive compression, limited bandwidth, signal interference, hardware or software glitches, and errors in the encoding and decoding process. Such imperfections may be more pronounced in areas of the video with rapid motion, sharp contrast, or intricate details, any or all of which may make preserving image quality technically challenging. Although numerous error correction techniques and advanced video codecs have been developed to minimize them, video artifacts remain prevalent in many digital video streams.

Some video artifacts may include sporadic and short-lived distortions that cause faces within a video stream to appear grotesque at close range. Such artifacts may result from weak digital signals or other factors such as excessive video compression. Since they are perceptual errors, conventional error correction mechanisms, such as Forward Error Correction (FEC) and Automatic Retransmission reqQuest (ARQ), might not identify them as malformed packets. As a result, conventional error correction mechanisms are not suitable for identifying and mitigating video artifacts.

Video artifacts may emerge at various stages of the video delivery path. For example, during the encoding stage prior to transmission, software glitches or over-compression may compromise the codec's functionality, resulting in the faulty encoding of numerous macroblocks. During transmission, bandwidth constraints may lead to malformed packet content, an issue that common error correction mechanisms may not be able to adequately resolve (e.g., since they are perceptual errors or content errors, etc.). In addition, at the receiving end, during the decoding phase, the codec may be inundated with data or experience software errors that generate video artifacts. Due to these and other challenges, it is technically challenging to detect and mitigate video artifacts using traditional solutions.

New and upcoming video coding standards (e.g., H.265, H.266) offer impressive video compression levels that may reduce the occurrence of video artifacts (e.g., artifacts caused by bandwidth limitations, etc.). However, these video coding standards are likely to facilitate the rise of more complex or bandwidth-hungry applications. Due to this complex interplay between capacity and demand, reducing video artifacts in real-time using conventional techniques has been and is anticipated to remain technically challenging for many years. This is evident by the continued presence and occurrence of video artifacts on TV and streaming video platforms despite advances in video coding standards.

The various embodiments include computing devices configured to implement a two-stage solution that utilizes machine learning and video coding techniques to eliminate, reduce, or mitigate the effects of video artifacts, particularly video artifacts that include sporadic or short-lived distortions that deform faces. The various embodiments may be particularly useful for applications such as TV presenters, major events, VIP/celebrity speeches and interviews, gaming, and virtual reality.

The various embodiments include computing devices configured to implement one or both stages of a two-stage solution. The first stage may include a detection stage in which the computing device uses enhanced frame differencing techniques to solve what is effectively an AI/ML-based classification problem. The detection stage may offer significant benefits over conventional solutions because it may allow for the early detection of video artifacts. Such early detection may allow content distributors to fix offline issues and re-transmit affected video recordings to cloud DVRs and/or improve the user experience and customer satisfaction for service providers and multiple-system operators (MSOs). In addition, the detection stage is not limited to detecting facial video artifacts and may be used to identify other visual distortions in the image.

The second stage may include a mitigation stage in which the computing device replaces a distorted face with an avatar. Creating a realistic avatar or human persona using conventional solutions may include complex processes that require lengthy, power-intensive, and/or processor-intensive tasks that are not suitable for use in real-time systems. As such, in some embodiments, the computing device may be configured to implement enhanced avatar creation techniques that do not consume significant power or processing resources and/or which are suitable for use in real-time systems (e.g., to make corrections to live programming, in real-time, etc.).

In some embodiments, the computing device may be equipped with a pixel/frame subtractor component, an AI/ML detector component, a control module, an avatar generator component, an avatar compositor component, a stream splitter, and a stream switcher. The control module may be configured to oversee the detection and mitigation processes and to coordinate the communication between internal components and external systems. The stream splitter and switcher may switch between regular and modified streams, as instructed by the control module.

The pixel/frame subtractor component may be configured to subtract pixel intensity values from consecutive frames to identify differences between them. The AI/ML detector component may be a pre-trained AI/ML classification engine that is configured to take the subtracted pixel intensities as input and generate a binary value indicating the presence of pixelation artifacts as output. In various embodiments, the computing device may be configured to use various different AI/ML techniques to detect faces and pixelation artifacts in the video. The computing device may also define a threshold value for comparison metrics and avoid further examination in response to determining that the metrics are below the threshold.

The avatar generator may be configured to create or retrieve avatars based on the detected faces in the video stream. The avatar generator may query an avatar database to determine whether an avatar already exists for a detected face and create a new avatar in response to determining that an avatar does not exist for a detected face. The avatar compositor may be configured to generate a modified video stream/broadcast by integrating the generated avatars onto the video frame (e.g., replace an affected human face with a reconstructed avatar frame-by-frame), mapping a corresponding audio stream's intonations and accentuations to avatar facial expressions, synchronizing the timestamps the audio and modified video.

Figure 1B:
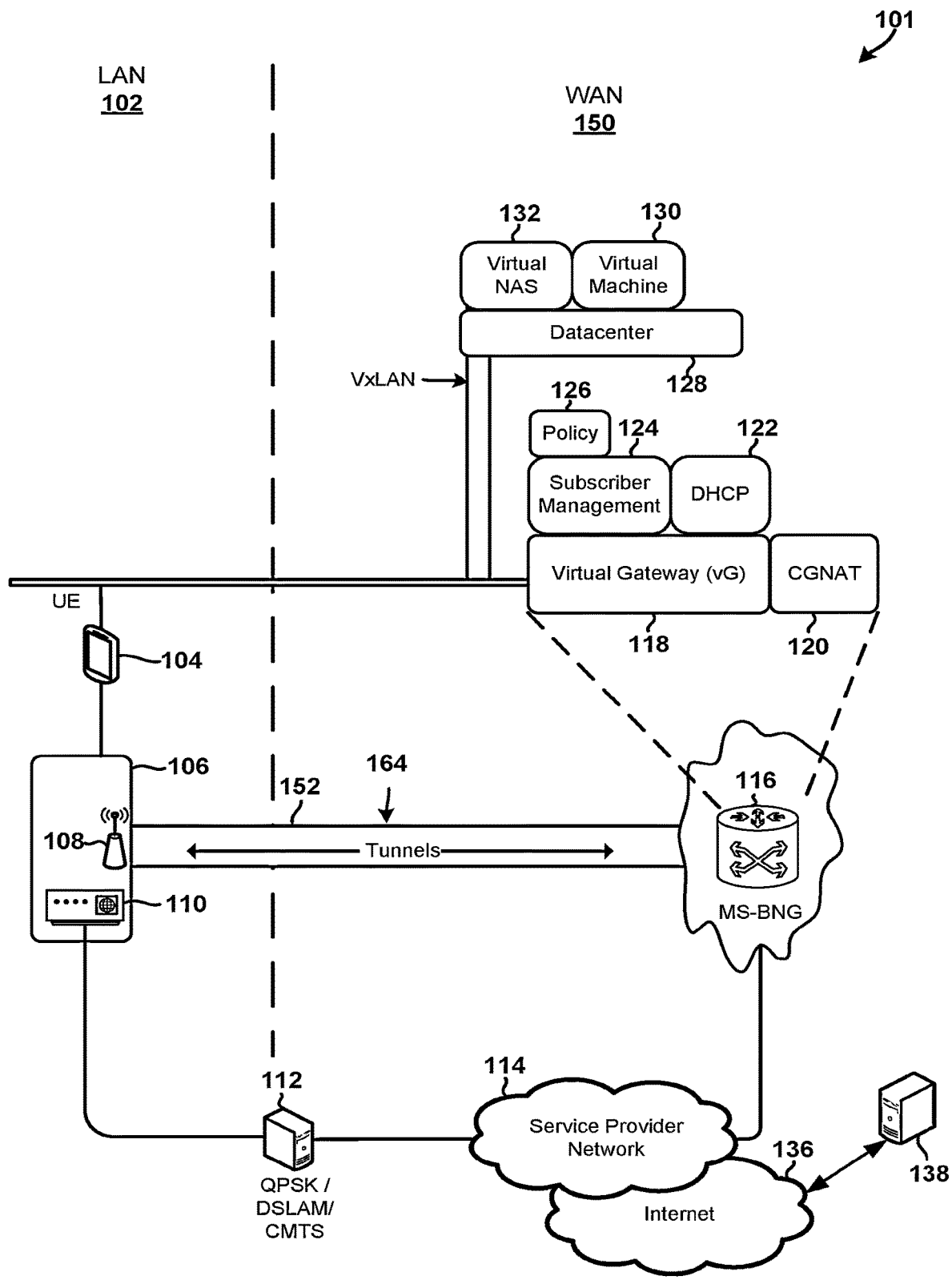

FIGS. 1A and 1B are simplified examples of content delivery systems 100, 101 that may be used to implement some embodiments. In the example illustrated in FIG. 1A, the network 100 includes a local area network (LAN) 102 and a wide area network (WAN) 150. The LAN 102 includes user equipment (UE) 104 devices (e.g., set-top-box, mobile device, etc.) coupled to a customer premise equipment (CPE) 106 component/device via wired 103 and wireless 105 communication links. The CPE 106 includes communication links 107 to a service provider network 114 within the WAN 150 that allow the UE 104 devices to send and receive information to and from the Internet 136. The system may also include a content server 138 that is configured to send content (e.g., audio-video content, etc.) to the UE 104 devices via the Internet 136, WAN 150, and/or service provider network 114.

In the example, illustrated in FIG. 1B, the network includes a LAN 102, a UE 104 device, a CPE 106, a bridged residential gateway (BRG) 108, a cable modem (CM) 110, a quadrature phase shift keying (QPSK), digital subscriber line access multiplexer (DSLAM), or a cable modem termination system (CMTS) 112, a service provider network 114, a multi-service broadband network gateway (MS-BNG) 116 component, a virtual gateway (vG) 118 component, a carrier-grade network address translation (CGNAT) 120 component, a dynamic host configuration protocol (DHCP) 122 component, a subscriber management 124 component, a policy 126 component, a datacenter 128 component, a virtual machine 130 component, and a virtual network-attached storage (NAS) 132 component. Communications also may be facilitated via out-of-band (OOB) tunnels 152, a generic routing encapsulation (GRE) tunnel, local area network (LAN) links, virtual extensible LAN (VXLAN) links, and other wired or wireless communication links.

Quadrature phase shift keying (QPSK) is a type of digital modulation technique used to transmit digital signals over radio frequencies. It is commonly used in satellite communication systems and cable TV networks. The cable modem termination system (CMTS) may be a device used by cable service providers to provide high-speed internet access to their customers via cable networks. The CMTS may act as a bridge between the cable network and the internet, allowing data to be transmitted and received by CMs 110. Together, QPSK and CMTS may be used in cable TV networks to transmit digital signals, including internet data, to CMs 110 in households or businesses or LANs 102. For example, the QPSK/CMTS 112 component may be deployed in a headend or hubsite and configured to facilitate high-speed communications between the CM 110 and the components within the service provider network 114. QPSK may be used to modulate the digital signals, and the CMTS may be used to manage and control the transmission of data over the cable network.

A CPE device 106 may include a cable modem, digital subscriber line modem, router, switch, firewall, packet filter, wireless access point, and/or a residential gateway that provides network connectivity to home or small office network. In particular, a CPE device 106 may allow UE devices 104 on the LAN 102 to connect to WAN 150 and ultimately the Internet 136.

The CM 110 may be a network bridge that provides bi-directional data communication via radio frequency channels on a hybrid fiber-coaxial (HFC) and/or radio frequency over glass (RFoG) infrastructure. The service provider network 114 may include various network components for providing consumers with access to the Internet 136 or IP services over broadband connections.

In some embodiments, the network 101 may provide DHCP server functionally locally in the LAN 102 via the CPE 106. Alternatively, in some embodiments, the network 101 may include a DHCP 122 component in the WAN 150 and conventional CPE functions (e.g., DHCP, NAT, firewall, etc.) may be distributed between the BRG 108 in LAN 102 and the MS-BNG 116 or vG 118 in the WAN 150. Moving such functions from the LAN 102 onto the WAN 150 may allow the CPE 106 component to operate as a simple connectivity device that allows the UE 104 to connect to information and resources on the WAN 150. The MS-BNG 116 component may be configured to facilitate communications with the CPE 106 component via the GRE encapsulated tunnel 152. The MS-BNG 116 component and the CPE 106 component may create a logical subscriber link (LSL) between the BRG 108 component and the vG 118 component. The CGNAT 120 component may be configured to translate private-to-private IP addresses and private-to-public IP addresses. The DHCP 122 component may be an independent platform (with the MS-BNG 116 operating as a DHCP relay) or may be hosted by or within the MS-BNG 116. The DHCP 122 component may be configured to dynamically assign an IP address to each UE 104 device as part of a lease assignment.

The subscriber management 124 component may store subscriber information and/or perform various subscription management operations. The policy 126 component may be configured to determine and/or enforce various rules and policy decisions. The datacenter 128 component, virtual machine 130 component, and virtual NAS 132 component may provide a commodity hardware and a secure computing infrastructure for hosting the MS-BNG 116 or vG 118 components. These components may be used for hosting specialized services available to the customer as an extension of their home LAN 102.

It should be understood that the various embodiments may be implemented in any of a variety of different networks and digital content distribution systems, and the various embodiments should not be limited to the components or examples illustrated and described with reference to FIG. 1A or 1B unless expressly recited as such in the claims.

The example digital content distribution networks 100 and 101 discussed above may be used to transmit high definition (HD) video files from the content server 138 to user equipment devices 104. Uncompressed HD video files are generally too large for standard broadcasting, streaming, or disk storage. As such, some embodiments may include computing devices (e.g., content server 138, UE 104 devices, etc.) that are equipped with a coding system (e.g., encoding and/or decoding system, etc.) configured to perform encoding operations that compress and encode video files, making them more manageable for transmission, streaming, and storage. In some embodiments, the encoding operations may leverage spatial redundancy and/or temporal redundancy in the video frames to transmit fewer bits.

Spatial redundancy typically arises when image content changes slowly across a frame. In some embodiments, the computing device may be configured to use intra-frame compression techniques that take advantage of spatial redundancy to compress information within a single frame. Said another way, in some embodiments, the computing device may be configured to implement a spatial compression technique that utilizes redundant information within a single frame.

Temporal redundancy usually results from high video frame rates (e.g., 30 frames per second) and the similarity between consecutive frames. Future frames often contain information nearly identical to the present frame, except in cases with significant movement, action, or scene changes. As such, in some embodiments, the computing device may be configured to use temporal redundancy inter-frame compression techniques to compress information across multiple frames. For example, the computing device may be configured to implement a temporal compression technique that generates residuals by subtracting a predicted frame from a reference frame. The computing device may be configured to transmit only the residuals, which may represent the difference between the predicted and reference frames. The receiver device (e.g., UE device 104, etc.) may be configured to use these residuals and motion vectors to reconstruct the original frames (e.g., as part of the decoding operations, etc.).

Figure 2A:
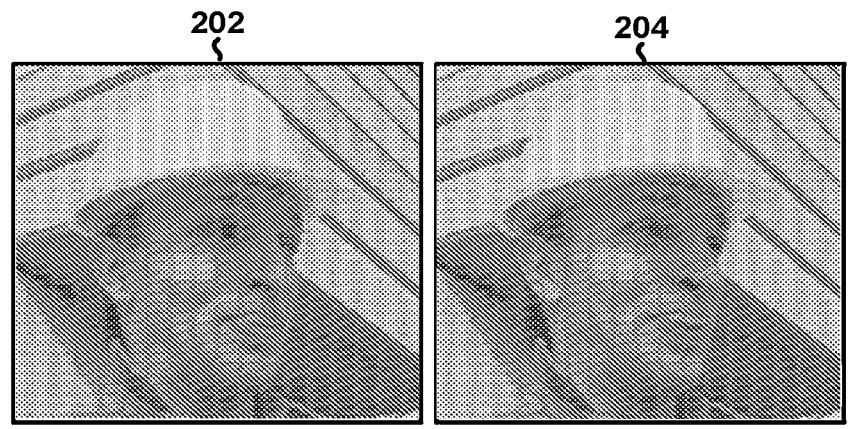
FIGS. 2A-2C illustrate example video frames and residuals that may be used to detect and/or mitigate video artifacts in accordance with some embodiments.
Figure 2B:
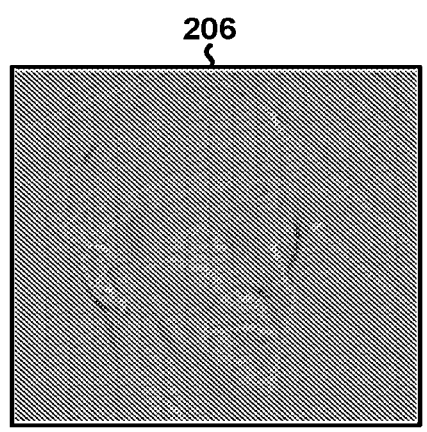
Figure 2C:
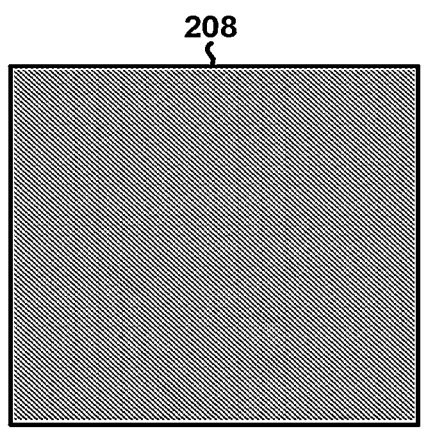

FIG. 2A through 2C illustrate example video frames and residuals that may be used to detect or mitigate video artifacts in accordance with the embodiments. The example illustrated in FIG. 2A includes a current frame 202 and a subsequent frame 204. FIG. 2B illustrates an example residual 206 (also called residual errors, delta, delta frame, difference frame, etc.) that may be generated by subtracting the pixel intensities of two adjacent frames (e.g., frames 202 and 204). FIG. 2C illustrates a residual 208 that is generated to account for inter-frame movement in accordance with some embodiments and thus includes less information (i.e., the pixel intensity difference between consecutive frames is less than residual 206, etc.).

With reference to FIGS. 1A-2C, some embodiments may include a computing device (e.g., server 138, etc.) configured to perform video coding operations. In some embodiments, the video coding operations may include temporal redundancy inter-frame compression operations that include comparing a still frame (e.g., frame 202) to an adjacent frame (e.g., frame 204). The computing device may reduce the compressed video size by encoding only key frames as complete images and representing all other frames using a residual (e.g., residual 206, 208) that indicates changes from the previous frame. The residuals may highlight deviations from the key frame, which may serve as a reference point for decoding and playback in the compressed video stream. In some embodiments, the residual frames may be a predictive (P) or bi-predictive (B) frames. The key frame may be an intra-coded (I) frame or an instantaneous decoding refresh (IDR) frame.

In some embodiments, the video coding operations may include dividing each video frame into smaller subdomains called macroblocks or coding tree units (CTUs). Macroblocks and motion vectors may be used in MPEG encoding to estimate inter-frame movement. In some embodiments, the computing device may be configured to account for this motion to further reduce the pixel intensity difference between consecutive frames. By using frame differencing and accounting for motion in video frames, the computing device may more efficiently identify pixelation artifacts in videos, making it easier for a trained ML model to detect these imperfections.

In some embodiments, the computing device may be configured to use the residuals that are generated as part of the coding operations discussed above.

In some embodiments, the computing device may be configured to actively generate the residuals through pixel subtraction of adjacent frames. Pixel subtraction is a technique used to detect motion between consecutive video frames and may include subtracting the corresponding pixel intensities of two consecutive frames.

In some embodiments, the computing device may be configured to determine a video frame by its pixel intensities and calculate the difference between adjacent frames by subtracting corresponding pixel intensities to produce one or more residuals.

Thus, to indicate changes from a previous frame, the computing device may subtract the pixel intensities of two adjacent frames (e.g., frames 202 and 204) to create residuals. As illustrated in FIGS. 2B and 2C, in instances in which there are no drastic movements or scene changes between frames, the residuals may appear as a mostly grey, bland image with discernible areas indicating motion.

In some embodiments, the computing device may be configured to generate the residuals to include minimal or a reduced amount of information such that any aberrations become more noticeable and may be readily used to identify pixelation effects using a trained ML engine. That is, due to the similarity between adjacent frames, the typically rectangular-shaped pixelation artifacts become more noticeable once the frames are subtracted. A trained ML model may be designed to rapidly detect these abnormalities.

Some embodiments may include computing devices configured to implement a two-stage solution, the first stage of which may include a detection stage in which the computing device uses pixel subtraction to solve an AI/ML-based classification problem.

In some embodiments, the detection stage may include the computing device performing artifact detection operations. Many pixelation artifacts have telltale rectangular shapes (e.g., due to macroblocks used in the encoding process). As such, in some embodiments, the artifact detection operations may include identifying pixelation artifacts in videos by detecting small rectangular shapes.

In some embodiments, the computing device may be configured to take advantage of similarities between video image creation and neural network input structures.

In some embodiments, the computing device may be configured to utilize the features or characteristics of the ML classification engine to detect new pixelation artifacts faster or more efficiently.

In some embodiments, the computing device may include an ML classification engine that is configured to use the pixel intensities in its input layers.

In some embodiments, the ML classification engine may be trained to recognize small rectangular shapes within a video.

Figure 3:
FIG. 3 is an illustration of an example binary matrix that may be created and used by the computing device to solve an artificial intelligence (AI)/machine learning (ML) based classification problems in accordance with some embodiments.

FIG. 3 illustrates an example binary matrix 300 that may be created and used by the computing device to solve an AI/ML-based classification problem in accordance with some embodiments. That is, for artifact detection, the computing device may train the ML engine using a collection of images containing artifacts. In the pre-processing stage of a classification engine, the computing device may divide the image into a grid that includes numerous cells and create the binary matrix 300 by scanning the image and assigning proportional values to pixel intensities. In the simplified example illustrated in FIG. 3, a digitized version of the image is constructed with cells containing either a 0 or 1. In other embodiments, rather than using just 0 or 1, the pixel intensity values may range between 0 and 255 for each RGB color mode. The pixel intensities from each cell may form the input layer of the ML engine, and the output from the ML engine may indicate a classification.

Figure 4A:
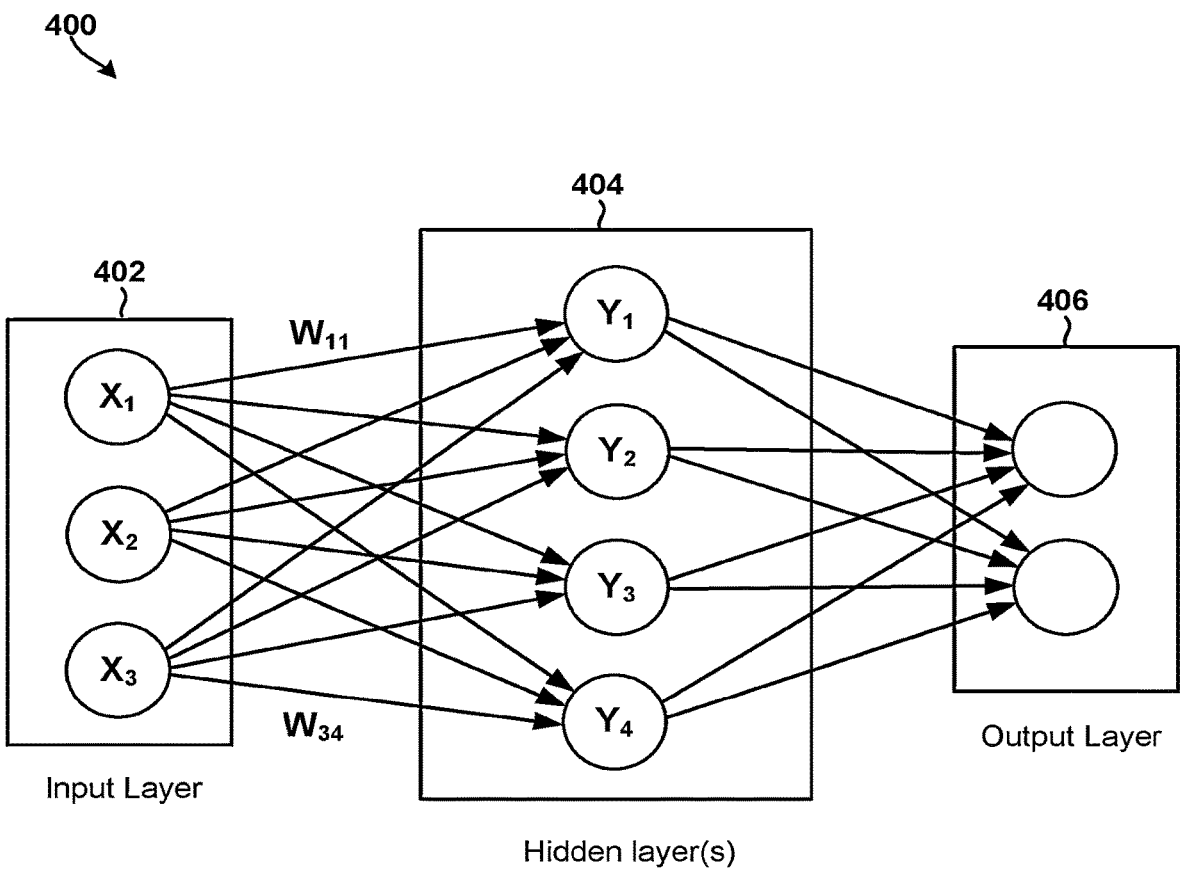
FIGS. 4A-4C are component block diagrams that illustrate example neural networks that may be implemented in a computing device configured to detect and/or mitigate video artifacts in accordance with some embodiments.
Figure 4B:
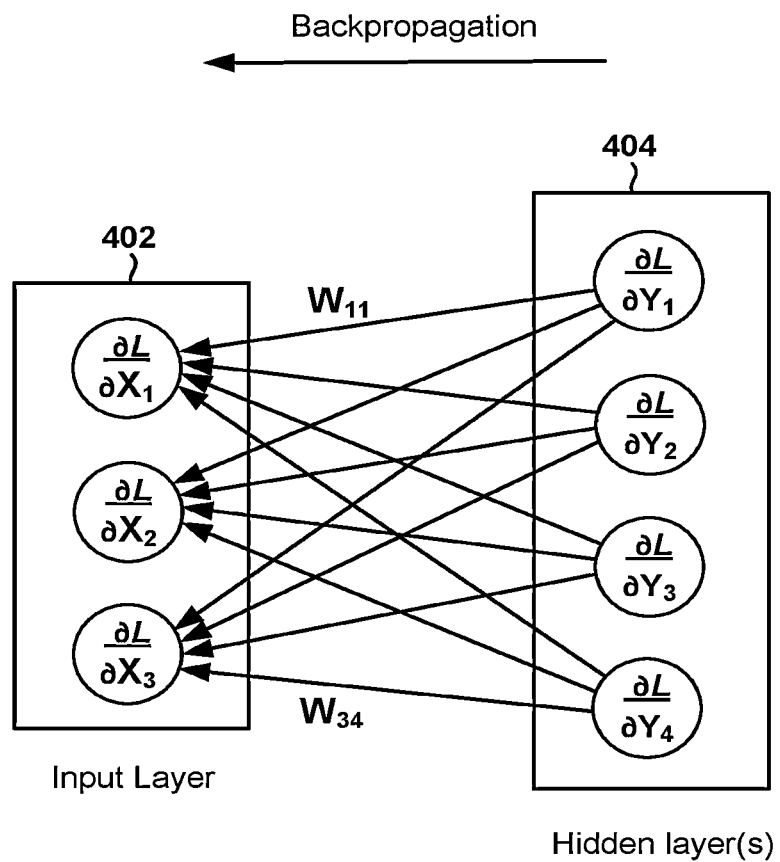
Figure 4C:
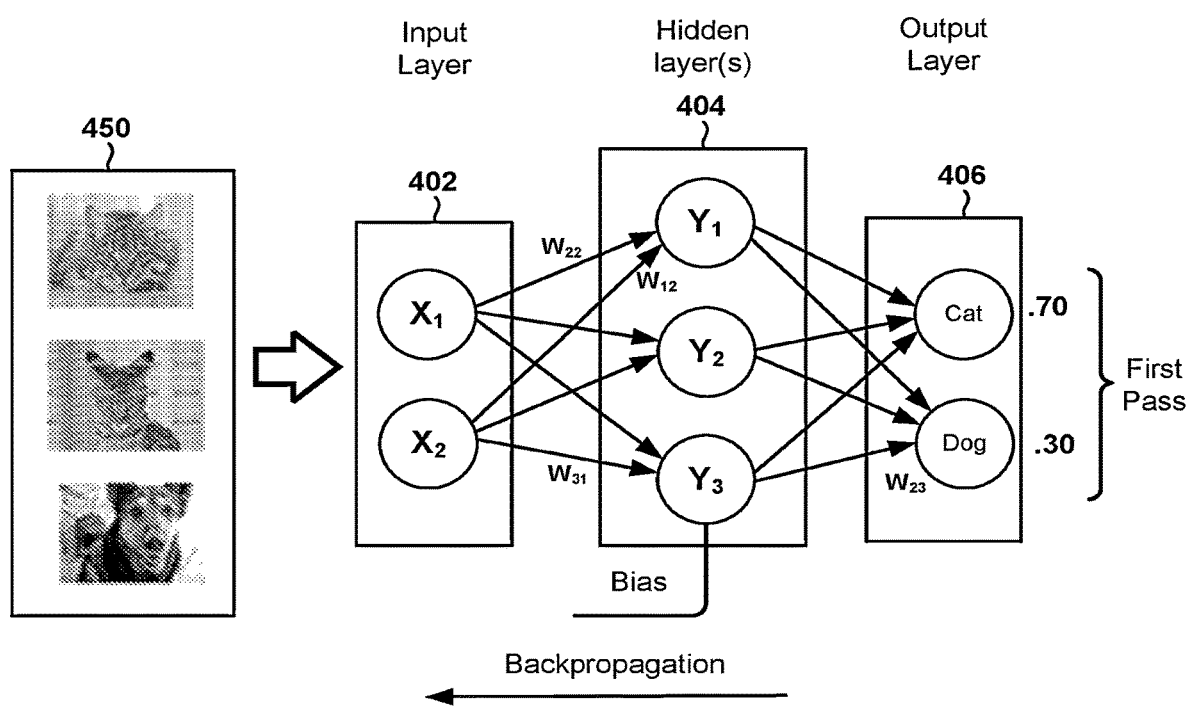

FIGS. 4A-4C illustrate example neural networks 400 that may be implemented in a computing device, and which may benefit from implementing the embodiments. With reference to FIGS. 4A-4C, the neural network 400 may include an input layer 402, hidden layer(s) 404, and an output layer 406. Each of the layers 402, 404, 406 may include one or more processing nodes that receive input values, perform computations based on the input values, and propagate the result (activation) to the next layer. In feed-forward neural networks, all of the computations are performed as a sequence of operations on the outputs of a previous layer. The final set of operations may generate the output of the neural network, such as a probability that an image contains a specific item (e.g., dog, cat, etc.) or information indicating that a proposed action should be taken.

The neural network 400 illustrated in FIG. 4A includes fully connected (FC) layers, which are also sometimes referred to as multi-layer perceptrons (MLPs). In a fully connected layer, all outputs are connected to all inputs. Each processing node's activation is computed as a weighted sum of all the inputs received from the previous layer.

An example computation performed by the processing nodes and/or neural network 400 may be: $y_j = f(\Sigma_{i=1}^{3} W_{ij} * x_i + b)$, in which $W_{ij}$ are weights, $x_i$ is the input to the layer, $y_j$ is the output activation of the layer, $f(\cdot)$ is a non-linear function, and b is bias. As another example, the neural network 400 may be configured to receive pixels of an image (i.e., input values) in the first layer, and generate outputs indicating the presence of different low-level features (e.g., lines, edges, etc.) in the image. At a subsequent layer, these features may be combined to indicate the likely presence of higher-level features. For example, in training of a neural network for image recognition, lines may be combined into shapes, shapes may be combined into sets of shapes, etc., and at the output layer, the neural network 400 may generate a probability value that indicates whether a particular object is present in the image.

The neural network 400 may learn to perform new tasks over time. Learning may be accomplished during a training process in which the values of the weights and bias of each layer are determined. Training the neural network 400 may include causing the neural network 400 to process a task for which an expected/desired output is known, and comparing the output generated by the neural network 400 to the expected/desired output. The difference between the expected/desired output and the output generated by the neural network 400 may be referred to as loss (L). After the training process is complete, the neural network 400 may begin "inference" to process a new task with the determined weights and bias.

During training, the weights ($w_{ij}$) may be updated, such as by using a hill-climbing optimization process called "gradient descent." The gradient may indicate how the weights should change in order to reduce loss (L). A multiple of the gradient of the loss relative to each weight, which may be the partial derivative of the loss $$\left(e.g., \frac{\partial L}{\partial X1}, \frac{\partial L}{\partial X2}, \frac{\partial L}{\partial X3}\right)$$

with respect to the weight, may be used to update the weights. One way to compute the partial derivatives of the gradient is through a process called backpropagation, an example of which is illustrated in FIG. 4B.

Backpropagation may include passing values backward through the network to compute how the loss is affected by each weight. The backpropagation computations may be similar to the computations used when traversing the neural network 400 in the forward direction (i.e., during inference).

To improve performance, the loss (L) from multiple sets of input data ("a batch") may be collected and used in a single pass of updating the weights. Many passes may be required to train the neural network 400 with weights suitable for use during inference (e.g., at runtime or during the execution of a software application program).

FIG. 4C illustrates an example in which a neural network of a computing device is configured to perform a simplified cat/dog classification based on input images or pictures of animals. The computing device may scan each picture 450 line-by-line to create a long vector indicating the pixel intensities at each point of the image. As discussed above with reference to FIGS. 2A-2C, the pixel intensities may be readily available as part of the video coding process. As a result, the computing device may instantly calculate residuals by subtracting pixel intensities from two frames. The residuals may be used to generate an input layer of neural network for video artifact detection. Having the pixel data readily available as input to the AI/ML engine may allow the computing device to perform the detection operations faster or more efficiently.

Figure 5B:
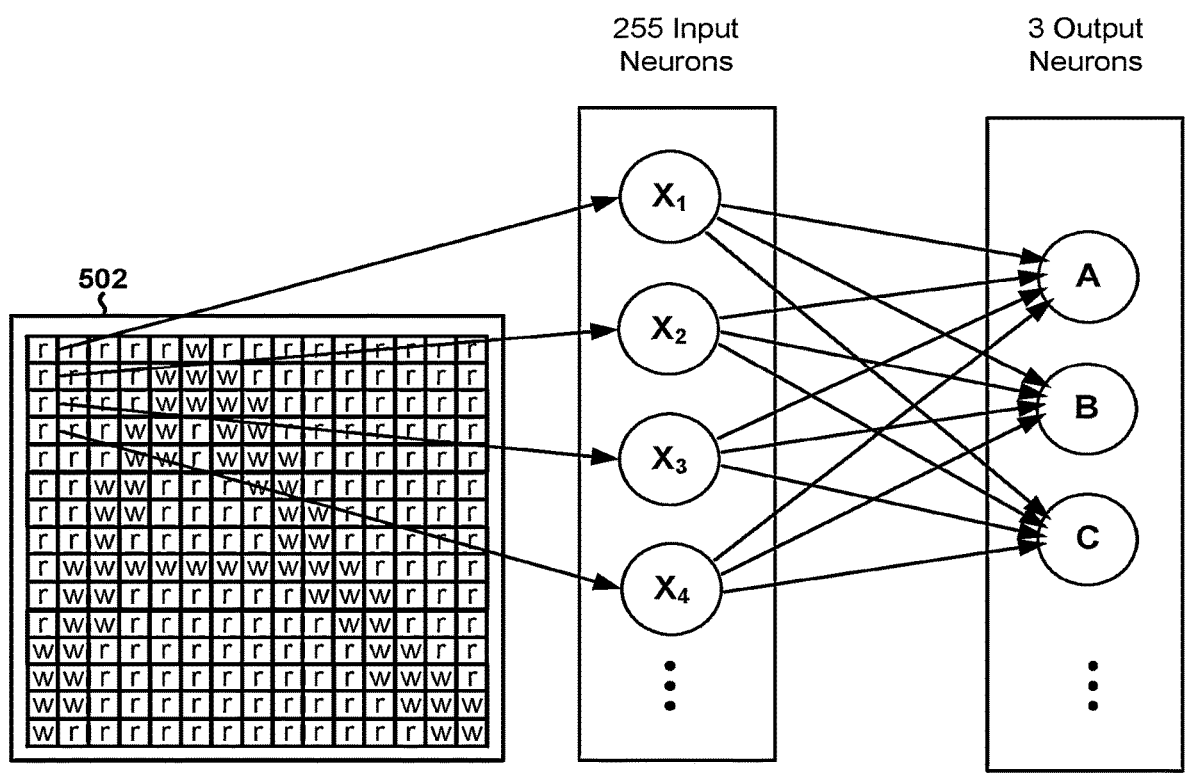

FIGS. 5A and 5B illustrate an example 15×15 grid information structure 502 that may be used to construct an input layer (e.g., input layer 402) to identify letters in the alphabet, which may be configured to perform detection and mitigation operations in accordance with the various embodiments. In the example illustrated in FIGS. 5A and 5B, the individual letters are drawn on the 15×15 grid 502. Scanning each row (or column) in a sequential manner would yield an input layer (vector) with 255 entries. In the example illustrated in FIG. 5A, the first column (15 slots) may yield: w w w w w w w w w w w r r r r. The second column (15 slots) may yield: w w w w w w w w r r r r r r w.

During the training phase, the output layer values may be set according to the letter in the input (e.g., for letter A the output layer may be set to '1, 0, 0, 0 . . . ' and for letter B, the output may be '0, 1, 0, 0 . . . ' etc.). The weights in the intermediate stages (hidden layers) may be adjusted accordingly to produce the desired output during the training process. Similarly, in a Cat-Dog example photos of the animals may be scanned line-by-line and the pixel intensity values may be mapped into a long vector forming the input layer. The assumption is that all cat photos share a certain similarity (connectedness), that is different from dog photos. Once trained, the output layer with just two values would indicate a cat as (1,0) and a dog as (0,1) for example. Similarly, in some embodiments, the input layer (e.g., input layer 402) may include subtracted pixel intensities and the output may indicate 'pixelation' with (1, 0) values and no defect with (0,1).

The above description is one example of how one common artificial neural network functions, which may be modified to evaluate residuals and detect video artifacts in a video stream in real time in accordance with the various embodiments. It should be understood that the AI/ML engines discussed in this application are not limited to any specific form of neural network but may include any other advanced network-based methods such as CNN, recurrent neural networks (RNN), Autoencoders and generative adversarial networks (GAN) methods, as well as non-neural (statistical) ML models such as random forest methods. As such, nothing in this application should be used to limit the scope of claims to a specific neural or non-neural model unless expressly recited as such in the claims.

As mentioned above, some embodiments may include computing devices configured to implement a two-stage solution, the first stage of which may include a detection stage in which the computing device uses pixel subtraction (frame differentiation) to solve an AI/ML-based classification problem. The second stage may include replacing a distorted image with a reconstructed frame with an overlayed avatar.

Some embodiments may include computing devices that are configured to replace a detected distorted image with a reconstructed frame that includes an overlayed avatar. In some embodiments, the avatar motions may be limited to mouth, eye, and minor head movements. As such, the computing device may perform the reconstruction without consuming an excessive amount of computing or network resources.

Generally, several photos of the subject from different angles may be required to create a realistic Avatar. If the subject is already known (e.g., is a TV personality, etc.), such data may be stored in a database (e.g. uploaded to the CDN, etc.) and accessible to the computing device. If the subject is new or unknown and/or image data for avatar creation is otherwise not readily available, the computing device may use the previous frames in the video stream (prior to the aberration) to fulfill that requirement. For transient defects, the head movements are usually not too drastic. As such, the role of the avatar may be limited to lip-syncing (in sync with the audio channel) and/or minor facial expressions.

Figure 6A:
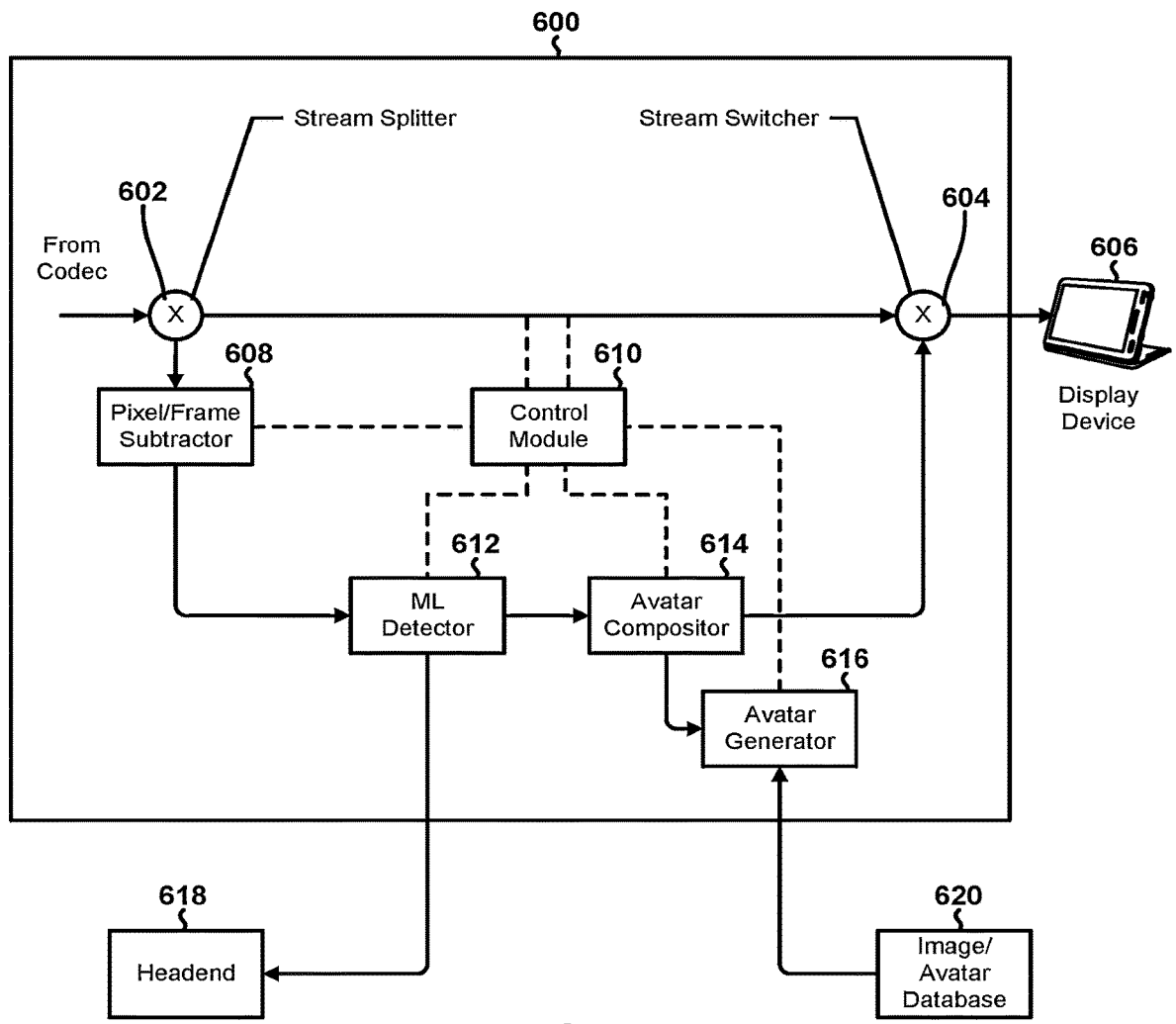
FIGS. 6A and 6B are component block diagrams that illustrate example components that may be included in and/or used by a computing system configured to perform detection and mitigation operations in accordance with the various embodiments.
Figure 6B:
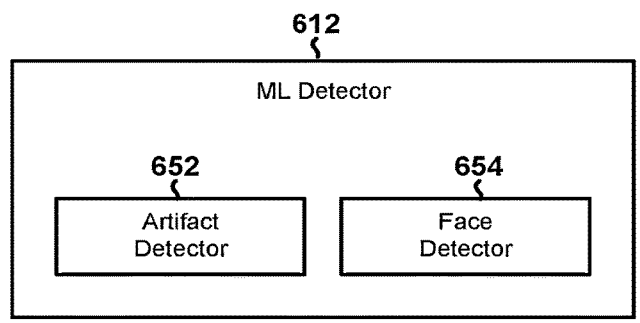
Figure 7A:
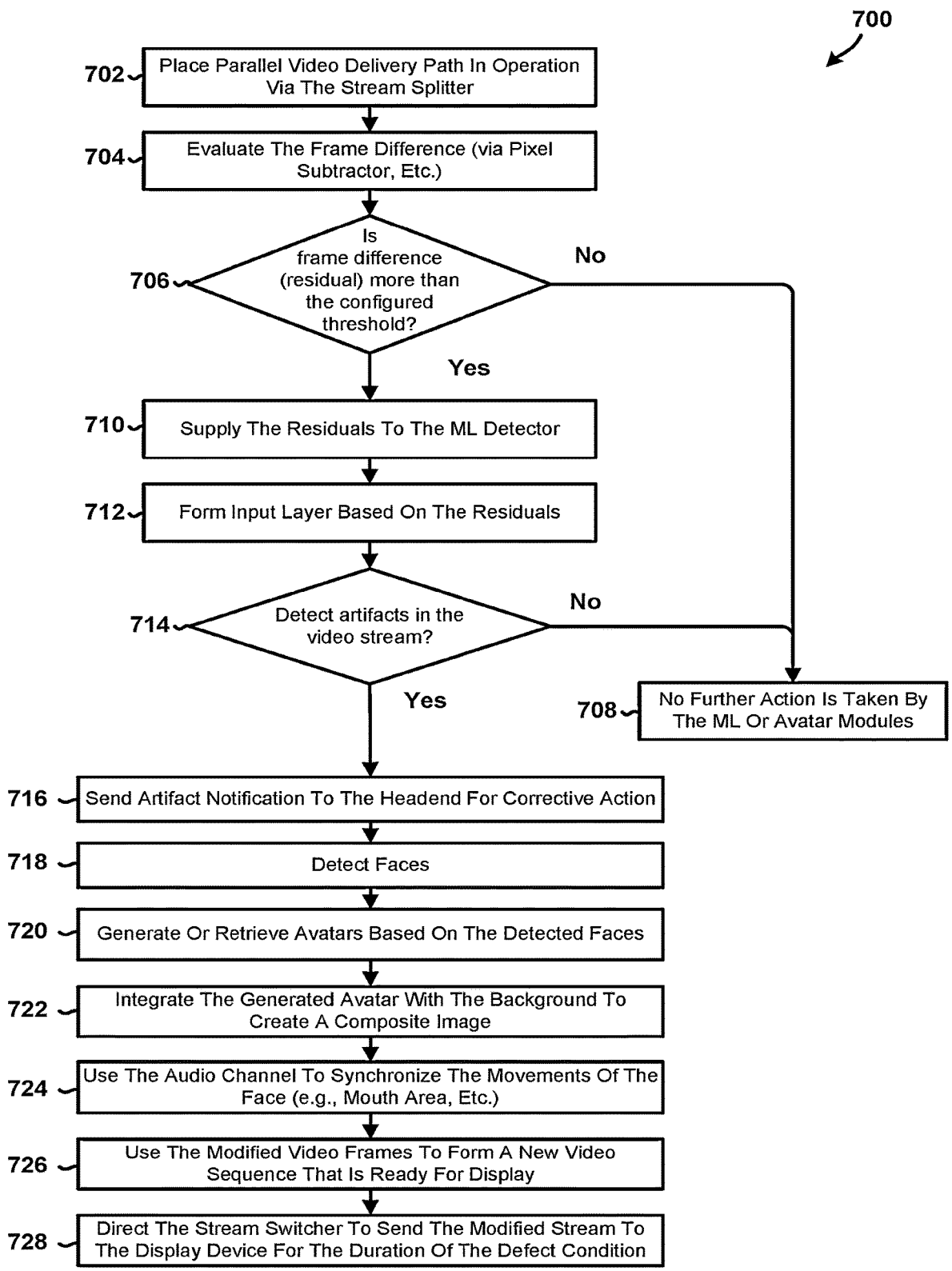
FIGS. 7A-7D are process flow diagrams illustrating methods of detecting and mitigating video artifacts in accordance with some embodiments.
Figure 7B:
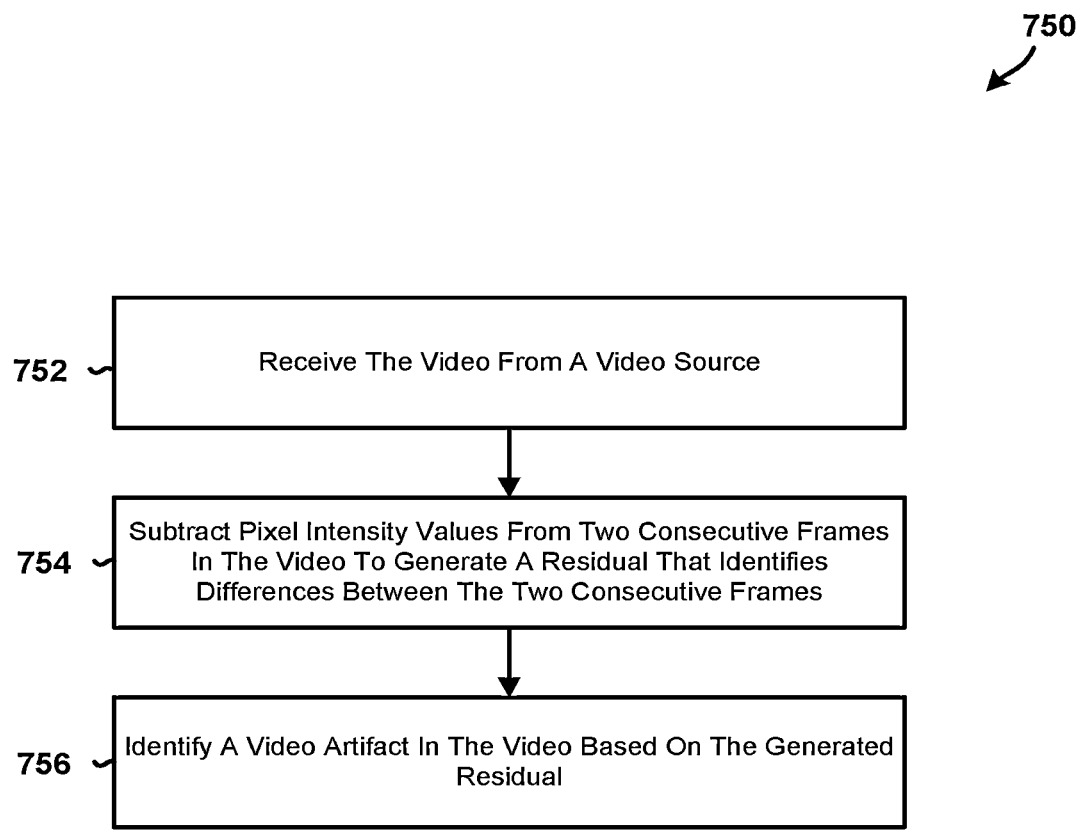
Figure 7C:
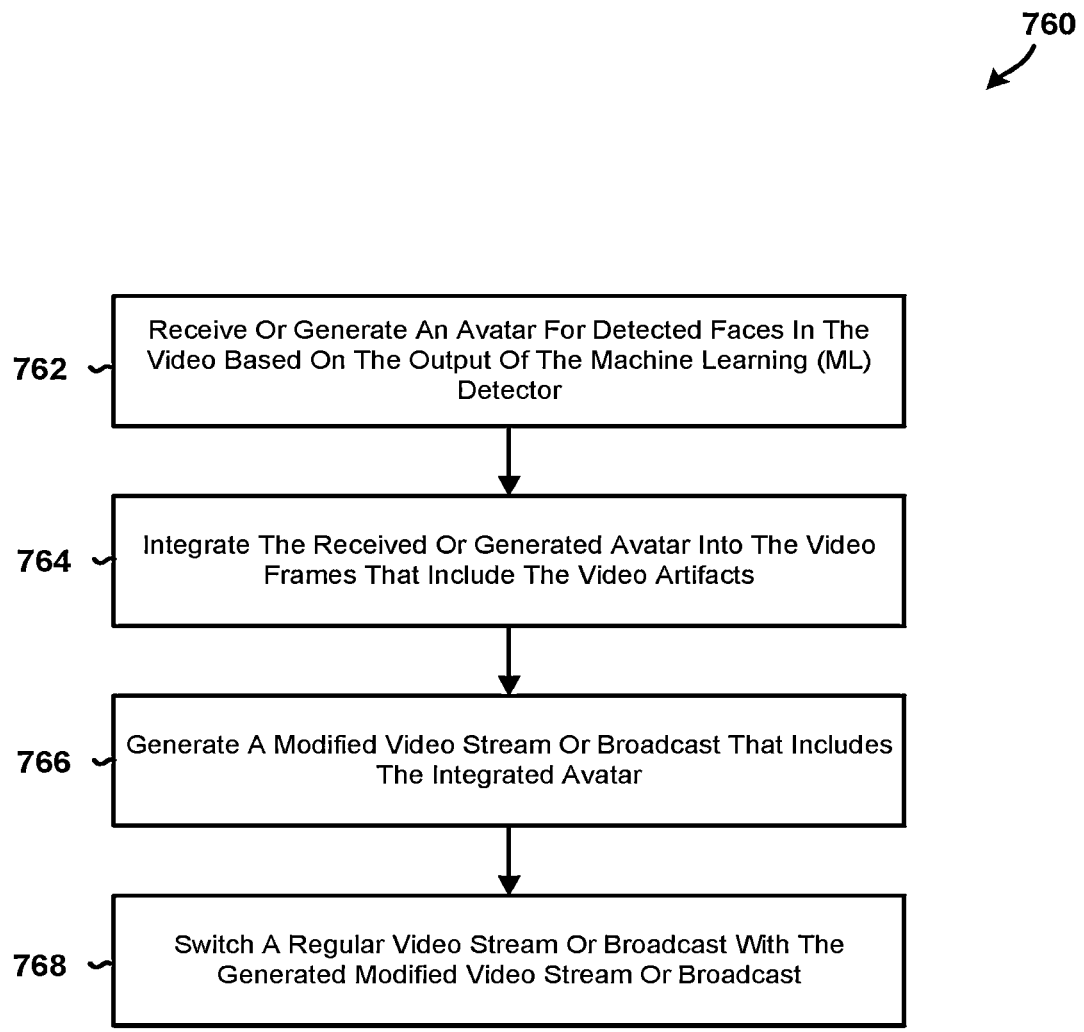
Figure 7D:
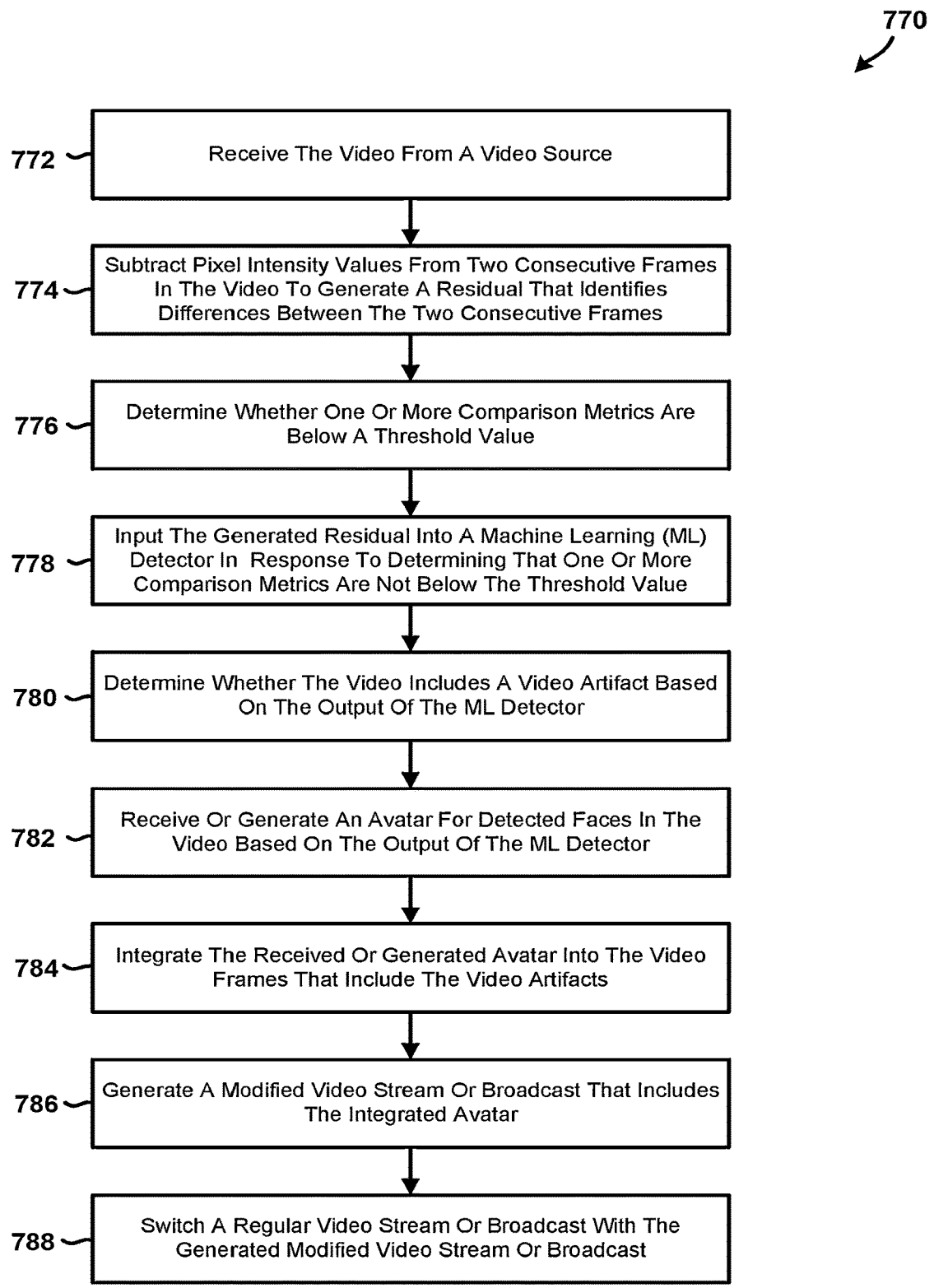

FIGS. 6A and 6B illustrate example components that may be included in and/or used by a computing system (e.g., server 138) configured to perform detection and mitigation operations in accordance with the various embodiments. The example illustrated in FIG. 6A includes a computing unit 600 coupled to a display device 606, headend 618 component, and an image/avatar database 620 component. In some embodiments, the computing unit 600 may be included in a computing device configured to apply one or both of the stages in the two-stage solution at the encoding and/or decoding stages, or immediately before video playback. The computing unit 600 may include a stream splitter 602 component, a stream switcher 604 component, a pixel/frame subtractor 608 component, a control module 610, a machine learning (ML) detector 612 component, an avatar compositor 614 component, and an avatar generator 616 component. In the example illustrated in FIG. 6B, the ML detector 612 component includes an artifact detector 652 component and a face detector 654 component.

The components (e.g., pixel/frame subtractor 608, ML detector 612, control module 610, avatar generator 616, etc.) may be located in separate servers or all consolidated within one hardware unit 600 such as the end user device (e.g., UE 104 device, etc.). In some embodiments, one or more of the components (e.g., headend 618, image/avatar database 620, etc.) may reside in the cloud. In some embodiments, the ML detector 612 may be an ML classification engine (pre-trained). In some embodiments, the stream splitter 602 and stream switcher 604 components may be parallel video delivery path and switching components.

The control module 610 and the associated modules may be caused to enter an active state to process a video. This may be accomplished via a device-specific configurable menu or through an automated process initiated by a notification (e.g. IP messaging) from the headend 618. The control module 610 may be configured to oversee the detection and mitigation processes via APIs between internal components and external systems such as headend 618 and CDN (not illustrated separately in FIG. 6A).

The ML detector 612 may include a neural network and/or a non-neural statistical classification model such as Support Vector Machine or Random Forest. The input for the ML detector 612 may be the subtracted pixel intensities from the pixel/frame subtractor 608. The output of the ML detector 612 may be a binary outcome (e.g., a Boolean value indicating whether pixelation artifacts are detected or not, etc.) that operates as a trigger for the avatar compositor 614 and/or avatar generator 616. In some embodiments, the computing device may be configured to implement an ML technique in which a bounding box is placed on the impacted face(s).

In some embodiments, the ML detector 612 may be a composite ML detector 612 that includes two separate ML engines/models and/or is configured to perform two actions. For example, the composite ML detector 612 may include a first ML engine/model (e.g., artifact detector 652, etc.) that is configured to detect artifacts, and a second ML engine/model (e.g., face detector 654, etc.) that is configured to detect faces from the video frames (e.g., to be passed onto the avatar generator 616 to create avatars, etc.). The composite ML detector 612 may detect faces with ML technology and draw bounding boxes around faces to detect or mitigate pixelation.

The pixel/frame subtractor 608 may be configured to subtract pixel intensity (sometimes called 'pixel density') values from consecutive frames, which may yield the change or difference between the frames. At 30 frames per second (fps) speed, that difference is perceptually small. Other methods for comparing two images include Mean Square Error (MSE) and Structural Similarity Index (SSIM). The MSE value may compute the mean square error between corresponding pixels for the two images. SSIM may compute the pixel density values to assess the similarities between the two images/frames. The computing device may be configured to use these or other image comparison methods as optional pre-processing steps.

In some embodiments, the computing device may define a 'threshold value' for the usage of these or other comparison metrics (e.g., pixel intensity, difference frame, MSE, SSIM, etc.). For example, the computing device may forgo further examination by the ML detector 612 (and Avatar creation) in response to determining that one or more of the metrics are below a certain threshold value. In some embodiments, the control module 610 may be configured to administer the threshold value.

The avatar generator 616 may be configured to perform any or all of the following operations (e.g., as directed by the control module 610, etc.). The avatar generator 616 may query the avatar database 620 to determine whether an avatar already exists for a detected face. If so, the avatar generator 616 may download the image or video file. If not, avatar generator 616 may create an avatar using the images extracted from previous frames. The avatar generator 616 may synthesize faces using still photos, reconstruct a realistic face with a single image, and/or create a 3-dimensional morphable face (3DMM) by creating a reference face model using a collection of sample faces and mapping and overlaying salient feature points such as the tip of the nose and corner of the eye to from the photograph(s) of the subject. The input to the avatar generator 616 may be a detected video stream. In some embodiments, the avatar generator 616 may use bounding boxes to identify the face(s) to be converted to an avatar.

The avatar compositor 614 may be configured to integrate the avatar image onto the corresponding video frame with the background image, synchronize the timestamps for both audio and video streams for proper continuity, and map the intonations and accentuations present in the audio stream to avatar facial expressions. The avatar compositor 614 may also merge several video frames to create a composite image. In some embodiments, the avatar compositor 614 may replace an affected human face with a reconstructed avatar frame-by-frame. In some embodiments, the avatar compositor 614 may include a submodule that includes an artifact removal tool that may be used to clean up the background.

The control module 610 may include control paths (illustrated in FIG. 6A by dashed lines) to various other components 602, 604, 608, 612-616, etc. The control module 610 may direct the other components to perform assigned tasks. The control module 610 may communicate with the components via standard APIs such as REST.

The parallel video delivery path and switching components (e.g., 602, 604, etc.) may be configured to operate to regulate broadcast TV (e.g., QAM-based video such as in cable, satellite transmission, etc.) as well as in streaming (e.g., IP based, via the internet or private intranet, etc.). A common application is in load-sharing such as in 'equal-cost multipath' (ECMP), a multicast technique for load splitting. In some embodiments, the control module 610 may be configured to direct stream selection. The default setting may be sending the regular stream received from the headend 618 to the customer device. The control module may direct the stream switcher 604 to switch to a modified stream in response to determining that the ML detector 612 detected an abnormal condition and the avatar generator 616 confirmed the successful creation of an avatar. The control module may direct the stream switcher 604 to switch from the alternate stream to the regular video stream in response to determining, based on communications received from the ML detector 612, that there are no more defects on the incoming stream.

The image/avatar database 620 may include relevant photos for creating avatars offline and prior to usage for well-known personalities. The image/avatar database 620 may also include avatars created beforehand (instead of just the photos). The image/avatar database 620 may include human-looking high-quality avatars created by third parties or individual companies.

FIGS. 7A-7D illustrate methods 700, 750, 760, 770 of detecting and mitigating video artifacts in accordance with some embodiments. Methods 700, 750, 760, 770 may be implemented by a processor in a computing device and/or by any combination of the components discussed above with reference to FIGS. 1A-6B.

In block 702, the computing device may place the parallel video delivery path in operation via a stream splitter 602. In block 704, the computing device may evaluate a frame difference (residual) via a pixel/frame subtractor 608. In determination block 706, the computing device may determine whether the frame difference is more than a configured threshold.

In response to determining that the frame difference is not more than the configured threshold (i.e., determination block 706="No"), in block 708 no further action is taken by the ML or avatar modules. For example, the computing device may continue to operate in a default setting in which it sends the regular stream received from the headend 618 to the customer device.

In response to determining that the frame difference is more than the configured threshold (i.e., determination block 706="Yes"), in block 710 the computing device may supply the residuals (also called residual errors, delta, delta frame, difference frame, etc.) to the ML detector 612. In block 712, the ML detector 612 may form its input layer 402 based on the residuals. It should be understood that, as illustrated in FIG. 6A, the parallel video delivery path still connects through the avatar processing modules all the way to the stream switcher (as shown by the solid line in the diagram).

In determination block 714, the computing device may perform the first stage of the two-stage solution discussed above in which the computing device uses pixel subtraction and the artifact detector 652 to determine whether there are video artifacts in the video stream. In response to determining that there are no video artifacts in the video stream (i.e., determination block 714="No"), in block 708 no further action is taken by the ML or avatar modules. For example, the computing device may continue to operate in a default setting in which it sends the regular stream received from the headend 618 to the customer device.

In response to determining that there are video artifacts in the video stream (i.e., determination block 714="Yes"), in block 716 the computing device may send an artifact notification to the headend 618 for corrective action. In some embodiments, the notification process may be initiated by the control module 610. Generally, these communications are done via REST APIs that were set up between the systems. Examples of data that may included in an artifact notification message and sent to the headend 618 include the recording ID #, defect severity, begin/end time stamps, etc.

In block 718, the computing device may detect faces via face detector 654 of the ML detector 612. In block 720, the computing device may generate or retrieve avatars based on the detected faces. For example, in block 720, the avatar generator 616 may generate the avatars or retrieve them from the remote avatar database 620 (e.g., for public figures/celebrities, etc.). In block 722, the computing device may integrate the generated avatar with the background to create a composite image. In block 724, the computing device may use the audio channel to synchronize the movements of the face (e.g., mouth area, etc.). In block 726, the computing device may use the modified video frames to form a new video sequence that is ready for display. In block 728, the computing device may (e.g., via the control module 610) direct the stream switcher 604 to send the modified stream to the display device 606 for the duration of the defect condition.

As mentioned above, in block 716 the computing device may send an artifact notification to the headend 618 for corrective action. That is, some embodiments may further include a method for defect status notification back to the headend 618. Once the ML detector 612 detects pixelations artifacts, the headend 618 is notified of the defect for corrective action. The data supplied for this action may include the recording ID #, defect severity and time stamp. Scanning through a full recording to identify the defective frames may be time consuming at the headend 618. If the affected frames are identified and notified, then it would help fix the problem quicker. This may include a method for 'Frame Identification'.

With reference to FIGS. 1-7B, in block 752, the processor in the computing device may receive the video from a video source. In block 754, the processor may subtract pixel intensity values from two consecutive frames in the video to generate a residual that identifies differences between the two consecutive frames. In block 756, the processor may identify a video artifact in the video based on the generated residual. In some embodiments, the processor may analyze the residual to detect shapes and determine whether the video includes a video artifact based on the detected shapes. In some embodiments, analyzing the residual to detect shapes comprises analyzing the residual to detect small rectangular, quadrilateral, triangular or amorphous shape. In some embodiments, analyzing the residual to detect shapes comprises analyzing the residual to detect a small rectangular shape.

In some embodiments, identifying the video artifact in the video based on the generated residual in block 756 may include the processor inputting the generated residual into a machine learning (ML) detector and determining whether the video includes a video artifact based on the output of the ML detector. In some embodiments, the ML detector may include a neural network or a non-neural statistical classification model. In some embodiments, the ML detector may include a first ML engine for detecting artifacts and a second ML engine for detecting faces.

With reference to FIGS. 1-7C, in block 762, the processor in the computing device may receive or generate an avatar for detected faces in the video based on the output of the machine learning (ML) detector. In some embodiments, receiving or generating the avatar for detected faces in the video based on the output of the ML detector may include querying an avatar database to determine whether an avatar already exists for a detected face and creating a new avatar in response to determining that the avatar does not exist for the detected face. In block 764, the processor may integrate the received or generated avatar into the video frames that include the video artifacts. In some embodiments, integrating the generated avatar into the video frames may include replacing a detected human face in the video with a reconstructed avatar frame-by-frame, mapping intonations and accentuations of corresponding audio to avatar facial expressions of the detected human face, and synchronizing timestamps of the audio and video for proper continuity. In some embodiments, integrating the generated avatar into the video frames may include replacing artifacts on a background portion of video frame to generate an updated background portion, integrating the generated avatar and the updated background portion to create a composite image, and integrating the composite image into the video frames that include the video artifacts. In block 766, the processor may generate a modified video stream or broadcast that includes the integrated avatar. In block 768, the processor may switch a regular video stream or broadcast with the generated modified video stream or broadcast.

With reference to FIGS. 1-7D, in block 772, the processor in the computing device may receive the video from a video source. In block 774, the processor may subtract pixel intensity values from two consecutive frames in the video to generate a residual that identifies differences between the two consecutive frames. In block 776, the processor may determine whether one or more comparison metrics are below a threshold value. In some embodiments, the processor may forgo further examination by a machine learning (ML) detector in response to determining that one or more comparison metrics are below a threshold value. In some embodiments, the comparison metrics may include a pixel intensity metric, a Mean Square Error (MSE) metric and/or a Structural Similarity Index (SSIM) metric.

In block 778, the processor may input the generated residual into a machine learning (ML) detector in response to determining that one or more comparison metrics are not below the threshold value. In block 780, the processor may determine whether the video includes a video artifact based on the output of the ML detector. In block 782, the processor may receive or generate an avatar for detected faces in the video based on the output of the ML detector. In block 784, the processor may integrate the received or generated avatar into the video frames that include the video artifacts. In block 786, the processor may generate a modified video stream or broadcast that includes the integrated avatar. In block 788, the processor may switch a regular video stream or broadcast with the generated modified video stream or broadcast.

In some embodiments, the computing device may be configured to use provisions of MPEG standard to include User Data in the stream. The 'key-frame' in the video sequence (also known as I-frame) may be identified by inserting an ID number to the 'user data' field of the video stream. This method preserves the ID number end-to-end (unlike other prevailing identification methods such as the usage of presentation time stamp (PTS) or the composition time stamp (CTS) features in MPEG/MP4 specifications).

Pixelation may be due to low quality encoding or transmission issues (packet drop, bandwidth constraints). Accordingly, in some embodiments the ML engine may be trained to distinguish between pixelation due to low quality encoding and pixelation due to transmission issues for both broadcast and IP systems. Using an avatar is beneficial for broadcast TV when there is no two-way path to request for retransmission. For two-way capable platforms like IP unicast or IP multicast platforms, it may be beneficial to have the "frame identification" information inserted to the video stream so that the video playback client can re-request a particular I-Frame when needed. In the MPEG-TS, identification information may be inserted to a separate PID. In the ISO-BMFF, identification information may be inserted to a separate data track.

Generally, the I-frame URL consists of a base URL and the I-frame filename identifier. The 'baseURL' may be sent with the iFrame ID as described above or sent separately. Additionally, the base URL of the I-frames may be sent using SCTE104 or SCTE-224 standard protocols, then converted to text track contained in the media stream at a predefined interval. For MPEG2-TS, the text track may be in a separate PID, or may embed the base URL in the SCTE-35 Content Identification (SCTE-35 type 6 signal, segmentation descriptor=1). Alternatively, program signals for example Program Start (SCTE-35 type 6 signal, segmentation descriptor=16) signal may be used to carry the base URL. In this case, the base URL may be carried in the UPID type 1 or 15 contained in the SCTE-35 signal. For MP4 and fMP4, the base URL may be carried in a separate text track.

Some embodiments may include methods for retrieving avatar/photos from the external database (e.g., as part of the operations in block 720). The photos or avatars of famous people may located in the CDN. To retrieve the content, the Avatar generator 616 may need their URLs. In some embodiments, the computing device may be configured to include the image location URL in the manifest file for IP streaming applications. Manifest Manipulator is a component used by current streaming protocols such as HLS (Apple) and DASH (MPEG). Some of these protocols were not originally intended to support auxiliary data for machine learning analysis and may need to be augmented. The location URLs may be added to the video signal stream. In some embodiments, location URLs may be added to the video signal stream with SCTE224, which is an out-of-band communication protocol that may be used to generate, delete, or modify the SCTE35 signal. It may be loaded to a Placement Opportunity Information System (POIS) component as specified in SCTE-130 standard, which will then instruct the coder to add the URLs to the signal via a dedicated communication link such as IP based with REST APIs.

Some portions of the methods described above my use various computer vision techniques such as 'edge detection algorithms." Edges are the borders/boundaries between two different regions in an image. As discussed above, the methods may include computing the gradients (or in some cases second-order derivatives), to identify the discontinuities. Once the edges in a given video frame have been detected they are combined to determine the ones that form rectangles. Other well-known computer vision techniques that may be implemented or used by the computing device to detect edges are Sobel, Prewitt and Canny algorithms. These techniques, however, are designed to detect more complex shapes and may be computationally extensive.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 700, 750, 760, 770 may be substituted for or combined with one or more operations of the methods 700, 750, 760, 770, and vice versa.

Figure 8:
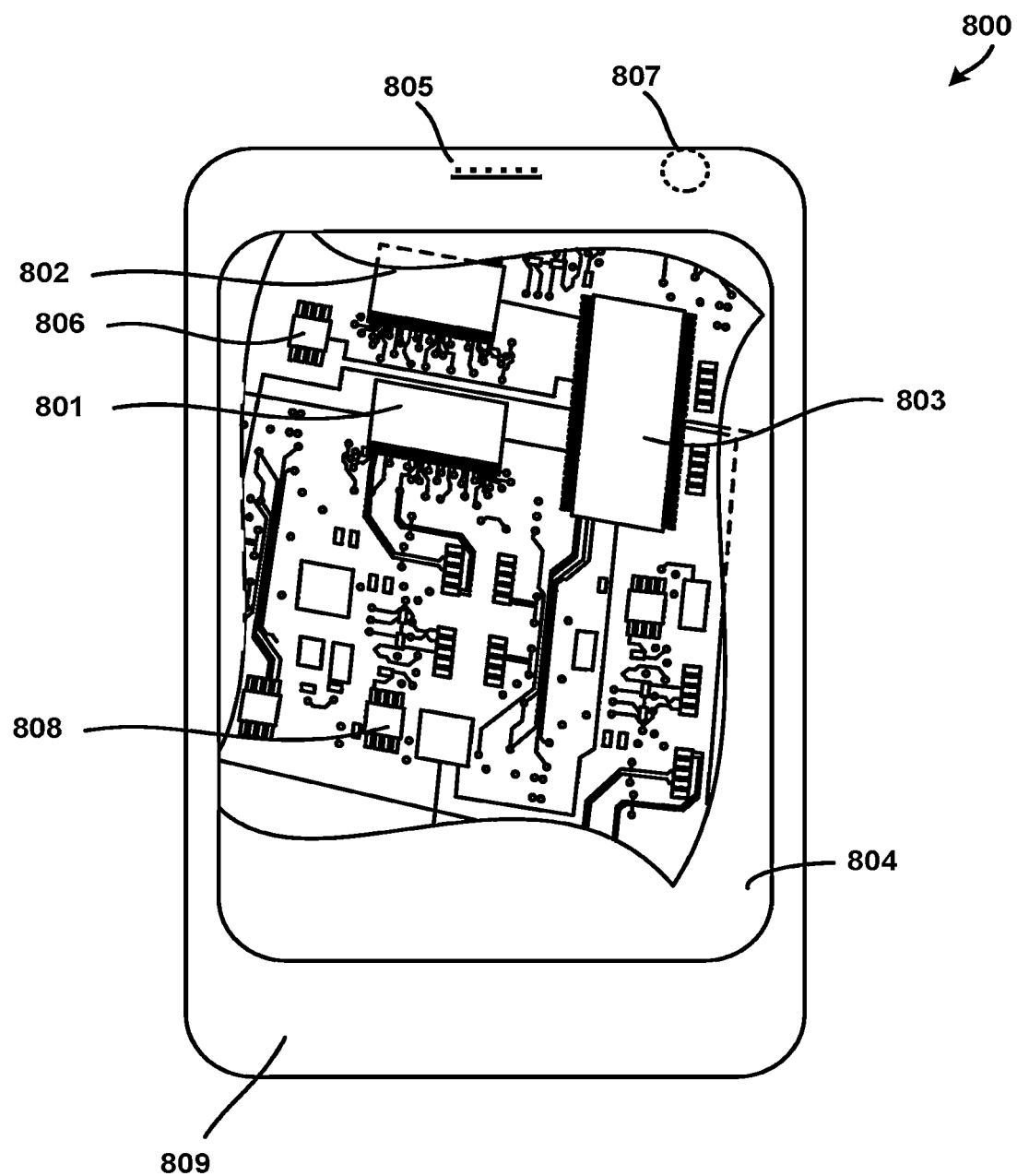
FIG. 8 is a component block diagram of a user equipment (UE) device suitable for implementing some of the embodiments.

Some embodiments (including, but not limited to, embodiments discussed above with reference to FIGS. 1-7B) may be implemented in any of a variety of UE computing devices (e.g., UE device 104, etc.), an example of which is illustrated in FIG. 8. For example, the computing device 800 may include a processor 801 coupled to a controller 802 and an internal memory 803. The processor 801 may be one or more multicore integrated circuits (ICs) designated for general or specific processing tasks. The internal memory 803 may be a volatile or non-volatile memory or a combination thereof.

With reference to FIG. 8, the UE computing device 800 may include a display 804, speakers 805, one or more radio signal transceivers 806 (e.g., Peanut®, Bluetooth®, Zig-Bee®, Wi-Fi, cellular, etc.) and antennae 807, for sending and receiving, coupled to each other and/or to the processor 801. The transceivers 806 and antennae 807 may be used with the above-mentioned circuitry to implement the various wireless transmission protocol stacks and interfaces. In some embodiments, a UE computing device 800 may include a cellular network wireless modem chip 808 that enables communication via a cellular network and is coupled to the processor.

The UE computing device 800 may also include a housing 809, constructed of plastic, metal, or a combination of materials, for containing all or some of the components discussed herein. The computing device 700 may include a power source coupled to the processor 801, such as a disposable or rechargeable battery. The rechargeable battery may also be coupled to the peripheral device connection port to receive a charging current from a source external to the UE computing device 800.

Figure 9:
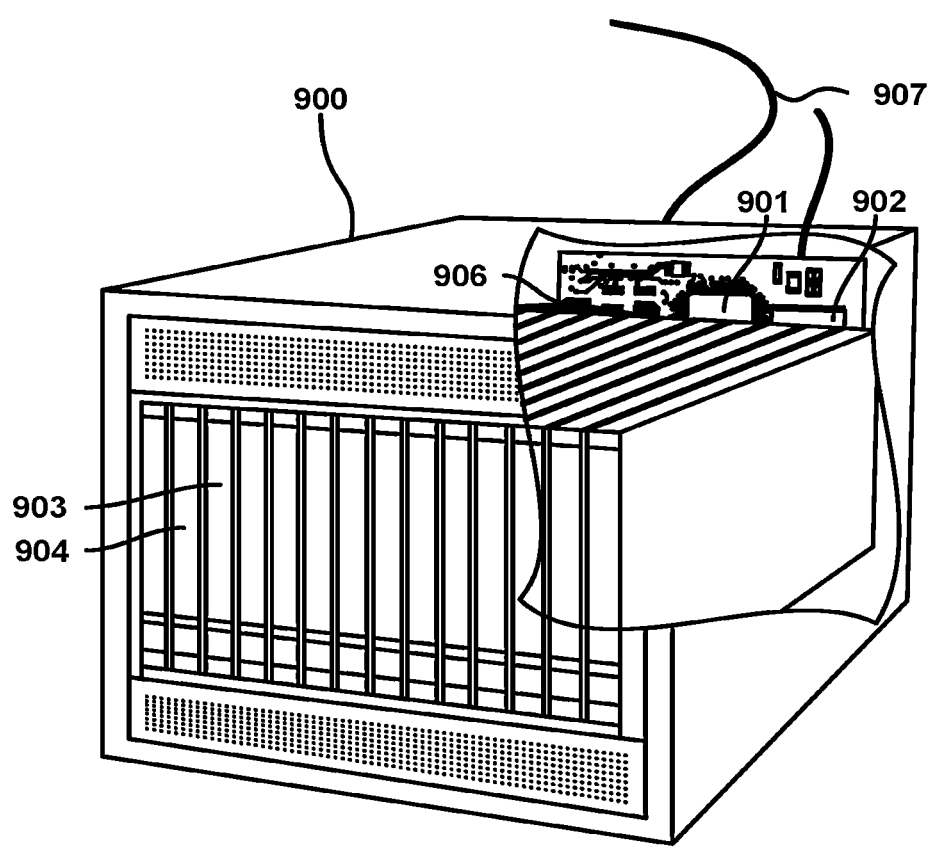
FIG. 9 is a component diagram of an example server suitable for implementing some embodiments.

Some embodiments (e.g., server 138, computing unit 600, etc.) may be implemented on any of a variety of commercially available computing devices, such as the server computing device 900 illustrated in FIG. 9. Such a server device 900 may include a processor 901 coupled to volatile memory 902 and a large capacity nonvolatile memory, such as a disk drive 903. The server device 900 may also include a floppy disc drive, USB, etc. coupled to the processor 901. The server device 900 may also include network access ports 906 coupled to the processor 901 for establishing data connections with a network connection circuit 904 and a communication network (e.g., IP network) coupled to other communication system network elements.

The processors discussed in this application may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeably.

Implementation examples are described in the following paragraphs. While some of the following implementation examples are described in terms of example methods, further example implementations may include: the example methods discussed in the following paragraphs implemented by a computing device including a processor configured with processor-executable instructions to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1: A method of detecting video artifacts in a video stream or broadcast, including receiving, by a processor in a computing device, the video from a video source, subtracting pixel intensity values from two consecutive frames in the video to generate a residual that identifies differences between the two consecutive frames, and identifying a video artifact in the video based on the generated residual.

Example 2: The method of example 1, in which identifying the video artifact in the video based on the generated residual includes analyzing the residual to detect shapes, and determining whether the video includes a video artifact based on the detected shapes.

Example 3: The method of any of the examples 1 and 2, in which analyzing the residual to detect shapes includes analyzing the residual to detect small rectangular, quadrilateral, triangular or amorphous shapes.

Example 4: The method of any of the examples 1-3, in which identifying the video artifact in the video based on the generated residual includes inputting the generated residual into a machine learning (ML) detector, determining whether the video includes a video artifact based on the output of the ML detector.

Example 5: The method of any of the examples 1-4, further including receiving or generating an avatar for detected faces in the video based on the output of the ML detector, integrating the received or generated avatar into the video frames that include the video artifacts, generating a modified video stream or broadcast that includes the integrated avatar, and switching a regular video stream or broadcast with the generated modified video stream or broadcast.

Example 6: The method of any of the examples 1-5, in which receiving or generating the avatar for detected faces in the video based on the output of the ML detector includes querying an avatar database to determine whether an avatar already exists for a detected face, and create a new avatar in response to determining that the avatar does not exist for the detected face.

Example 7: The method of any of the examples 1-6, in which integrating the generated avatar into the video frames that include the video artifacts and generating the modified video stream or broadcast that includes the integrated avatar comprise replacing a detected human face in the video with a reconstructed avatar frame-by-frame, mapping intonations and accentuations of a corresponding audio to avatar facial expressions of the detected human face, and synchronizing timestamps of the audio and video for proper continuity.

Example 8: The method of any of the examples 1-7, in which integrating the generated avatar into the video frames that include the video artifacts and generating the modified video stream or broadcast that includes the integrated avatar further includes replacing artifacts on a background portion of video frame to generate an updated background portion, integrating the generated avatar and the updated background portion to create a composite image, and integrating the composite image into the video frames that include the video artifacts.

Example 9: The method of any of the examples 1-8, in which the ML detector includes one or more of a neural network, or a non-neural statistical classification model.

Example 10: The method of any of the examples 1-9, in which the ML detector includes a first ML engine for detecting artifacts and a second ML engine for detecting faces.

Example 11: The method of any of the examples 1-10, further including forgoing further examination by the ML detector in response to determining that one or more comparison metrics are below a threshold value, in which the comparison metrics include one or more of a pixel intensity metric, a Mean Square Error (MSE) metric, or a Structural Similarity Index (SSIM) metric.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, components, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of detecting video artifacts in a video stream or broadcast, comprising:
   receiving, by a processor in a computing device, the video from a video source;
   subtracting pixel intensity values from two consecutive frames in the video to generate a residual that identifies differences between the two consecutive frames;
   identifying a video artifact in the video based on the generated residual; and
   integrating a generated avatar into the video frames that include the video artifact and generating a modified video stream or broadcast that includes the integrated avatar by:
      replacing artifacts on a background portion of video frame to generate an updated background portion;
      integrating the generated avatar and the updated background portion to create a composite image; and
      integrating the composite image into the video frames that include the video artifact.

2. The method of claim 1, wherein identifying the video artifact in the video based on the generated residual comprises:
   analyzing the residual to detect shapes; and
   determining whether the video includes a video artifact based on the detected shapes.

3. The method of claim 2, wherein analyzing the residual to detect shapes comprises analyzing the residual to detect small rectangular, quadrilateral, triangular or amorphous shapes.

4. The method of claim 1, wherein identifying the video artifact in the video based on the generated residual comprises:
   inputting the generated residual into a machine learning (ML) detector;
   determining whether the video includes a video artifact based on the output of the ML detector.

5. The method of claim 4, further comprising:
   receiving or generating an avatar for detected faces in the video based on the output of the ML detector; and
   switching a regular video stream or broadcast with the generated modified video stream or broadcast.

6. The method of claim 5, wherein receiving or generating the avatar for detected faces in the video based on the output of the ML detector comprises:
   querying an avatar database to determine whether an avatar already exists for a detected face; and
   create a new avatar in response to determining that the avatar does not exist for the detected face.

7. The method of claim 5, wherein integrating the generated avatar into the video frames that include the video artifacts and generating the modified video stream or broadcast that includes the integrated avatar comprise:
   replacing a detected human face in the video with a reconstructed avatar frame-by-frame;
   mapping intonations and accentuations of a corresponding audio to avatar facial expressions of the detected human face; and
   synchronizing timestamps of the audio and video for proper continuity.

8. The method of claim 4, wherein the ML detector includes one or more of:
   a neural network; or
   a non-neural statistical classification model.

9. The method of claim 4, wherein the ML detector includes a first ML engine for detecting artifacts and a second ML engine for detecting faces.

10. The method of claim 4, further comprising forgoing further examination by the ML detector in response to determining that one or more comparison metrics are below a threshold value, wherein the comparison metrics include one or more of:
    a pixel intensity metric;
    a Mean Square Error (MSE) metric; or
    a Structural Similarity Index (SSIM) metric.

11. A computing device, comprising:
    a processor configured to:
       receive a video from a video source;
       subtract pixel intensity values from two consecutive frames in the video to generate a residual that identifies differences between the two consecutive frames;
       identify a video artifact in the video based on the generated residual; and
       integrating a generated avatar into the video frames that include the video artifact and generating a modified video stream or broadcast that includes the integrated avatar by:
          replacing artifacts on a background portion of video frame to generate an updated background portion;
          integrating the generated avatar and the updated background portion to create a composite image; and
          integrating the composite image into the video frames that include the video artifact.

12. The computing device of claim 11, wherein the processor is configured to identify the video artifact in the video based on the generated residual by:
    analyzing the residual to detect shapes; and
    determining whether the video includes a video artifact based on the detected shapes.

13. The computing device of claim 12, wherein the processor is configured to analyze the residual to detect shapes by analyzing the residual to detect small rectangular, quadrilateral, triangular or amorphous shapes.

14. The computing device of claim 11, wherein the processor is configured to identify the video artifact in the video based on the generated residual by:
    inputting the generated residual into a machine learning (ML) detector;
    determining whether the video includes a video artifact based on the output of the ML detector.

15. The computing device of claim 14, wherein the processor is further configured to:
    receive or generate an avatar for detected faces in the video based on the output of the ML detector; and
    switch a regular video stream or broadcast with the generated modified video stream or broadcast.

16. The computing device of claim 15, wherein the processor is configured to receive or generate the avatar for detected faces in the video based on the output of the ML detector by:
    querying an avatar database to determine whether an avatar already exists for a detected face; and
    create a new avatar in response to determining that the avatar does not exist for the detected face.

17. The computing device of claim 15, wherein the processor is configured to integrate the generated avatar into the video frames that include the video artifacts and generate the modified video stream or broadcast that includes the integrated avatar by:

replacing a detected human face in the video with a reconstructed avatar frame-by-frame;

mapping intonations and accentuations of a corresponding audio to avatar facial expressions of the detected human face; and synchronizing timestamps of the audio and video for proper continuity.

18. The computing device of claim 14, wherein the ML detector includes one or more of:

a neural network; or a non-neural statistical classification model.

19. The computing device of claim 14, wherein the ML detector includes a first ML engine for detecting artifacts and a second ML engine for detecting faces.

20. The computing device of claim 14, wherein the processor is further configured to forgo further examination by the ML detector in response to determining that one or more comparison metrics are below a threshold value, wherein the comparison metrics include one or more of:

a pixel intensity metric;

a Mean Square Error (MSE) metric; or a Structural Similarity Index (SSIM) metric.

21. A non-transitory computer readable storage medium having stored thereon processor-executable software instructions configured to cause a processor to perform operations for detecting video artifacts in a video stream or broadcast, the operations comprising:

receiving the video from a video source;

subtracting pixel intensity values from two consecutive frames in the video to generate a residual that identifies differences between the two consecutive frames;

identifying a video artifact in the video based on the generated residual; and integrating a generated avatar into the video frames that include the video artifact and generating a modified video stream or broadcast that includes the integrated avatar by:

replacing artifacts on a background portion of video frame to generate an updated background portion;

integrating the generated avatar and the updated background portion to create a composite image; and integrating the composite image into the video frames that include the video artifact.

22. The non-transitory computer readable storage medium of claim 21, wherein the stored processor-executable software instructions are configured to cause a processor to perform operations such that identifying the video artifact in the video based on the generated residual comprises:

analyzing the residual to detect shapes; and determining whether the video includes a video artifact based on the detected shapes.

23. The non-transitory computer readable storage medium of claim 22, wherein the stored processor-executable software instructions are configured to cause a processor to perform operations such that analyzing the residual to detect shapes comprises analyzing the residual to detect small rectangular, quadrilateral, triangular or amorphous shapes.

24. The non-transitory computer readable storage medium of claim 21, wherein the stored processor-executable software instructions are configured to cause a processor to perform operations such that identifying the video artifact in the video based on the generated residual comprises:

inputting the generated residual into a machine learning (ML) detector;

determining whether the video includes a video artifact based on the output of the ML detector.

25. The non-transitory computer readable storage medium of claim 24, wherein the stored processor-executable software instructions are configured to cause a processor to perform operations further comprising:

receiving or generating an avatar for detected faces in the video based on the output of the ML detector; and switching a regular video stream or broadcast with the generated modified video stream or broadcast.

26. The non-transitory computer readable storage medium of claim 25, wherein the stored processor-executable software instructions are configured to cause a processor to perform operations such that receiving or generating the avatar for detected faces in the video based on the output of the ML detector comprises:

querying an avatar database to determine whether an avatar already exists for a detected face; and create a new avatar in response to determining that the avatar does not exist for the detected face.

27. The non-transitory computer readable storage medium of claim 25, wherein the stored processor-executable software instructions are configured to cause a processor to perform operations such that integrating the generated avatar into the video frames that include the video artifacts and generating the modified video stream or broadcast that includes the integrated avatar comprise:

replacing a detected human face in the video with a reconstructed avatar frame-by-frame;

mapping intonations and accentuations of a corresponding audio to avatar facial expressions of the detected human face; and synchronizing timestamps of the audio and video for proper continuity.

28. The non-transitory computer readable storage medium of claim 24, wherein the stored processor-executable software instructions are configured to cause a processor to perform operations such that the ML detector includes one or more of:

a neural network; or a non-neural statistical classification model.

29. The non-transitory computer readable storage medium of claim 24, wherein the stored processor-executable software instructions are configured to cause a processor to perform operations such that the ML detector includes a first ML engine for detecting artifacts and a second ML engine for detecting faces.

30. The non-transitory computer readable storage medium of claim 24, wherein the stored processor-executable software instructions are configured to cause a processor to perform operations further comprising forgoing further examination by the ML detector in response to determining that one or more comparison metrics are below a threshold value, wherein the comparison metrics include one or more of:

a pixel intensity metric;

a Mean Square Error (MSE) metric; or a Structural Similarity Index (SSIM) metric.

* * * * *